United States Patent
Wang et al.

(10) Patent No.: US 11,816,925 B2
(45) Date of Patent: Nov. 14, 2023

(54) FACE DETECTION METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Xinliang Wang, Shenzhen (CN); Bin Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 345 days.

(21) Appl. No.: 17/320,196

(22) Filed: May 13, 2021

(65) Prior Publication Data

US 2021/0271935 A1  Sep. 2, 2021

Related U.S. Application Data

(63) Continuation of application No. 16/521,089, filed on Jul. 24, 2019, now Pat. No. 11,080,565, which is a (Continued)

(30) Foreign Application Priority Data

May 22, 2017 (CN) .......................... 201710365520.6

(51) Int. Cl.
  *G06K 9/00*  (2022.01)
  *G06V 40/16*  (2022.01)
  (Continued)

(52) U.S. Cl.
  CPC ...... *G06V 40/165* (2022.01); *G06F 18/24323* (2023.01); *G06T 17/005* (2013.01);
  (Continued)

(58) Field of Classification Search
  None
  See application file for complete search history.

(56) References Cited

U.S. PATENT DOCUMENTS 9,355,302 B2  5/2016  He et al.
10,846,610 B2  11/2020  Kutzkov et al.
(Continued)

FOREIGN PATENT DOCUMENTS

CN  101419671 A  4/2009
CN  104392250 A  3/2015
(Continued)

OTHER PUBLICATIONS

Liu, Ruixu, et al. "Cascaded pose regression revisited: Face alignment in videos." 2017 IEEE Third International Conference on Multimedia Big Data (BigMM). IEEE, 2017. (Year: 2017).*
(Continued)

*Primary Examiner* — Avinash Yentrapati
(74) *Attorney, Agent, or Firm* — Anova Law Group, PLLC

(57) ABSTRACT

A face detection method for a computer device includes: obtaining a to-be-detected image; obtaining an initial shape of a current regression tree in a pre-constructed probability regression model; extracting image features from the to-be-detected image and respectively calculating a probability of each of leaf nodes of the current regression tree according to the image features; extracting an error of each of the leaf nodes; determining a shape error of the current regression tree according to the probability and the error of each of the leaf nodes; calculating an estimated shape of the current regression tree according to the initial shape and the shape error; and performing iterative calculation by using the estimated shape as an initial shape of a neighboring next regression tree until a last regression tree in the probability
(Continued)

regression model, to obtain an estimated shape of the last regression tree as a detected face shape.

20 Claims, 10 Drawing Sheets

Related U.S. Application Data continuation of application No. PCT/CN2018/085475, filed on May 3, 2018.

(51) Int. Cl.
  *G06T 17/00* (2006.01)
  *G06F 18/243* (2023.01)
  *G06V 10/764* (2022.01)

(52) U.S. Cl.
  CPC .......... *G06V 10/764* (2022.01); *G06V 40/161* (2022.01); *G06V 40/169* (2022.01); *G06V 40/171* (2022.01); *G06V 40/172* (2022.01)

(56) References Cited

U.S. PATENT DOCUMENTS

| | | |
|---|---|---|
| 10,943,091 B2 | 3/2021 | Lin et al. |
| 2014/0270364 A1 | 9/2014 | Baranowski et al. |
| 2016/0078323 A1 | 3/2016 | Mikiyas et al. |
| 2017/0076214 A1 | 3/2017 | Spisic et al. |
| 2018/0120813 A1 | 5/2018 | Coffman et al. |
| 2018/0181840 A1* | 6/2018 | Zatepyakin ............... G06T 7/75 |
| 2018/0182165 A1* | 6/2018 | Zatepyakin ........... G06T 17/205 |
| 2019/0236803 A1 | 8/2019 | Wang et al. |
| 2019/0370530 A1 | 12/2019 | Lin et al. |

FOREIGN PATENT DOCUMENTS

| | | |
|---|---|---|
| CN | 105469081 A | 4/2016 |
| CN | 105718913 A | 6/2016 |
| CN | 106529397 A | 3/2017 |
| CN | 107169463 A | 9/2017 |

OTHER PUBLICATIONS

The World Intellectual Property Organization (WIPO) International Search Report for PCT/CN2018/085475 dated Jul. 27, 2018 5 Pages (including translation).
The State Intellectual Property Office of the People's Republic of China (SIPO) Office Action 1 for 201710365520.6 dated Mar. 9, 2018 6 Pages (including translation).
The European Patent Office (EPO) The Extended European search Report for 18805735.0 dated May 12, 2020 9 Pages.
Hailiang Li et al., "Cascaded Face Alignment via Intimacy Definition Feature," Retrieved from the Internet: URL: https://arxiv.org/vc/arxiv/papers/1611/1611.06642v1.pdf, Nov. 21, 2016 (Nov. 21, 2016). 15 pages.
The European Patent Office (EPO) The Extended European Search Report for 18805735.0 dated Oct. 29,2021 6 Pages (including translation).
Congquan Yan et al., "LBF Based 3D Regression for Facial Animation," 2016 International Conference on Virtual Reality and Visualization (ICVRV), IEEE, Sep. 24, 2016 (Sep. 24, 2016), pp. 276-279. 4 pages.
Ruixu Liu et al., "Cascaded Pose Regression Revisited: Face Alignment in Videos," 2017 IEEE Third International Conference on Multimedia Big Data (BIGMM), IEEE, Apr. 19, 2017 (Apr. 19, 2017), pp. 291-298 8 pages.
Vahid Kazemi et al., "One Millisecond Face Alignment with an Ensemble of Regression Trees," 2014 IEEE Conference on Computer Vision and Pattern Recognition, IEEE, Jun. 23, 2014 (Jun. 23, 2014). 8 pages.

\* cited by examiner

FACE DETECTION METHOD AND APPARATUS, COMPUTER DEVICE, AND STORAGE MEDIUM

CROSS REFERENCES TO RELATED APPLICATIONS

This application is a continuation application of U.S. patent application Ser. No. 16/521,089, filed on Jul. 24, 2019, which in turn claims priority to PCT Patent Application No. PCT/CN2018/085475, filed on May 3, 2018, which in turn claims priority to Chinese Patent Application No. 201710365520.6, entitled "FACE DETECTION METHOD AND APPARATUS, COMPUTER DEVICE, AND STORAGE MEDIUM" filed with the China National Intellectual Property Administration on May 22, 2017, all of which are incorporated herein by reference in their entirety.

FIELD OF TECHNOLOGY

This application relates to the field of computer technologies and, in particular, to a face detection method, a face detection apparatus, a computer device, and storage mediums.

BACKGROUND OF THE DISCLOSURE

Along with rising of machine vision research, applications based on technologies such as face detection, marking, and analysis become current hotspots, including face identity recognition, face special effects, and expression analysis and recognition. All the applications are based on face detecting and marking technologies. For face marking, a face image is provided, positions of edges and contours of a face and five sense organs are marked in a face area of the face image, a contour shape of the face and positions and shapes of the five sense organs may be obtained according to the marked positions, to further perform feature analysis and attribute analysis.

Algorithms for performing face marking may mainly include a shape model algorithm, a cascaded regression algorithm, and an algorithm based on a neural network and a deep neural network. In the shape model algorithm, a shape formed by face feature points is modeled. Assuming a precondition is that any face shape can be obtained by rotating, translating, and scaling a relatively stable average shape. The cascaded regression algorithm is a non-parameter method, image features and shapes are modeled, mapping between image features and shapes is learned through a sample training process, the learning process is a gradually iterative process, a true shape is gradually approached until an error requirement is met. In the algorithm based on a neural network and a deep neural network, mapping between image features and feature point shapes is established through a plurality of layers of neural network models, and a determined function relationship between input image features and shapes is obtained through learning during a training process. An existing algorithm for face marking is based on a single frame image. For a video image sequence, due to influences of a camera and an external illumination environment, images of two consecutive frames of a video are obviously different even without any movement, causing jitter of feature points and unstable positions. Using the existing algorithm for face marking to perform face detection and marking on a video image sequence has a relative low accuracy.

The disclosed methods and systems are directed to solve one or more problems set forth above and other problems.

SUMMARY

According to one aspect of the present disclosure, a face detection method is provided for a computer device. The method includes obtaining a to-be-detected image; obtaining an initial shape of a current regression tree in a pre-constructed probability regression model; and extracting image features from the to-be-detected image and respectively calculating a probability of each of leaf nodes of the current regression tree according to the image features. The method also includes extracting an error of each of the leaf nodes from the current regression tree; determining a shape error of the current regression tree according to the probability and the error of each of the leaf nodes; and calculating an estimated shape of the current regression tree according to the initial shape and the shape error. Further, the method includes performing iterative calculation by using the estimated shape as an initial shape of a neighboring next regression tree until a last regression tree in the probability regression model, to obtain an estimated shape of the last regression tree as a detected face shape from the to-be-detected image.

According to another aspect of the present disclosure, a method is provided for constructing a face detection model by a computer device. The method includes constructing a cascaded regressive probability regression model according to a sample image set. The probability regression model comprises multi-level random forests, and each level of the random forests comprising a plurality of regression trees. Further, the constructing a cascaded regressive probability regression model according to a sample image set includes: selecting a first pixel pair collection randomly from the sample image set when constructing each level of the random forests; dividing sample images in the sample image set according to the first pixel pair collection, splitting to generate each of nodes of a regression tree, configuring a probability of each of leaf nodes of a generated regression tree, and determining an error of each of the leaf nodes according to a true shape of a sample image allocated to each of the leaf nodes and an initially predicted shape of the generated regression tree; and calculating a predicted shape of the generated regression tree according to the initially predicted shape of the generated regression tree and the error of each of the leaf nodes, taking the predicted shape as an initially predicted shape of a neighboring next regression tree and iteratively generating the next regression tree until generation of a regression tree of a last level of the random forest in the probability regression model is finished.

According to another aspect of the present disclosure, a computer device is provided. The computer device includes a memory and one or more processors coupled to the memory. The one or more processors is configured to perform: obtaining a to-be-detected image; obtaining an initial shape of a current regression tree in a pre-constructed probability regression model; extracting image features from the to-be-detected image and respectively calculating a probability of each of leaf nodes of the current regression tree according to the image features; extracting an error of each of the leaf nodes from the current regression tree; determining a shape error of the current regression tree according to the probability and the error of each of the leaf nodes; calculating an estimated shape of the current regression tree according to the initial shape and the shape error; and performing iterative calculation by using the estimated shape as an initial shape of a neighboring next regression tree until a last regression tree in the probability regression model, to obtain an estimated shape of the last regression tree as a detected face shape of the to-be-detected image.

The details of one or more embodiments of this application are disclosed in the following accompanying drawings and description. Other features, objectives, and advantages of this application become clearer from the specification, the accompanying drawings, and the claims.

BRIEF DESCRIPTION OF THE DRAWINGS

To describe the technical solutions in the embodiments of this application more clearly, the following briefly describes the accompanying drawings. Apparently, the accompanying drawings in the following description show merely some embodiments of the present disclosure, and a person of ordinary skill in the art may derive other drawings from these accompanying drawings without creative efforts.

DETAILED DESCRIPTION

To make the objectives, the technical solutions, and the advantages of the present disclosure clearer, the following further describes the present disclosure in detail with reference to the accompanying drawings. It should be understood that the specific embodiments described herein are only used to describe the present disclosure, not to limit the present disclosure.

Figure 1:
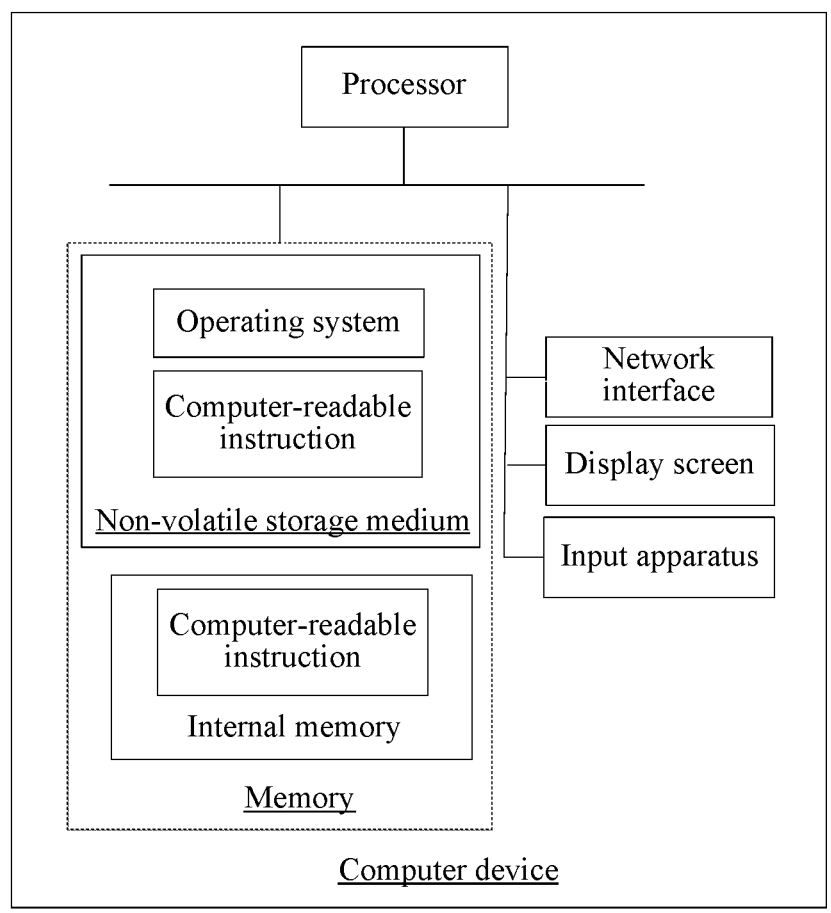
FIG. 1 is a block diagram of a computer device according to an embodiment of the present disclosure.

FIG. 1 is a block diagram of a computer device according to an embodiment of the present disclosure. As shown in FIG. 1, the computer device includes a processor, a memory, and a network interface that are connected through a system bus. The memory includes a non-volatile storage medium and an internal memory. The non-volatile storage medium of the computer device stores an operating system and computer-readable instructions. The computer-readable instructions, when being executed by the processor, may cause the processor to implement a face detection method. The processor is configured to provide computation and control functionalities, to support operation of the whole computer device. The internal memory stores computer-readable instructions. When being executed by the processor, the computer-readable instructions cause the processor to perform various disclosed method. The network interface is configured to perform network communication with other computer devices. The computer device may be a terminal such as a mobile phone, a tablet computer, a personal computer (PC), and may also be a server. A person skilled in the art may understand that, the structure shown in FIG. 1 is merely a block diagram of a partial structure related to a solution in the present disclosure, and does not constitute a limitation to the computer device to which the solution in the present disclosure is applied. Specifically, the computer device may include more or fewer components than those shown in the figure, or have some components combined, or have a different component deployment.

In another embodiment, the non-volatile storage medium of the computer device in FIG. 1 stores an operating system and computer-readable instructions. The computer-readable instructions are further used to, when being executed by the processor, cause the processor to implement a method for constructing a face detection model.

Figure 2:
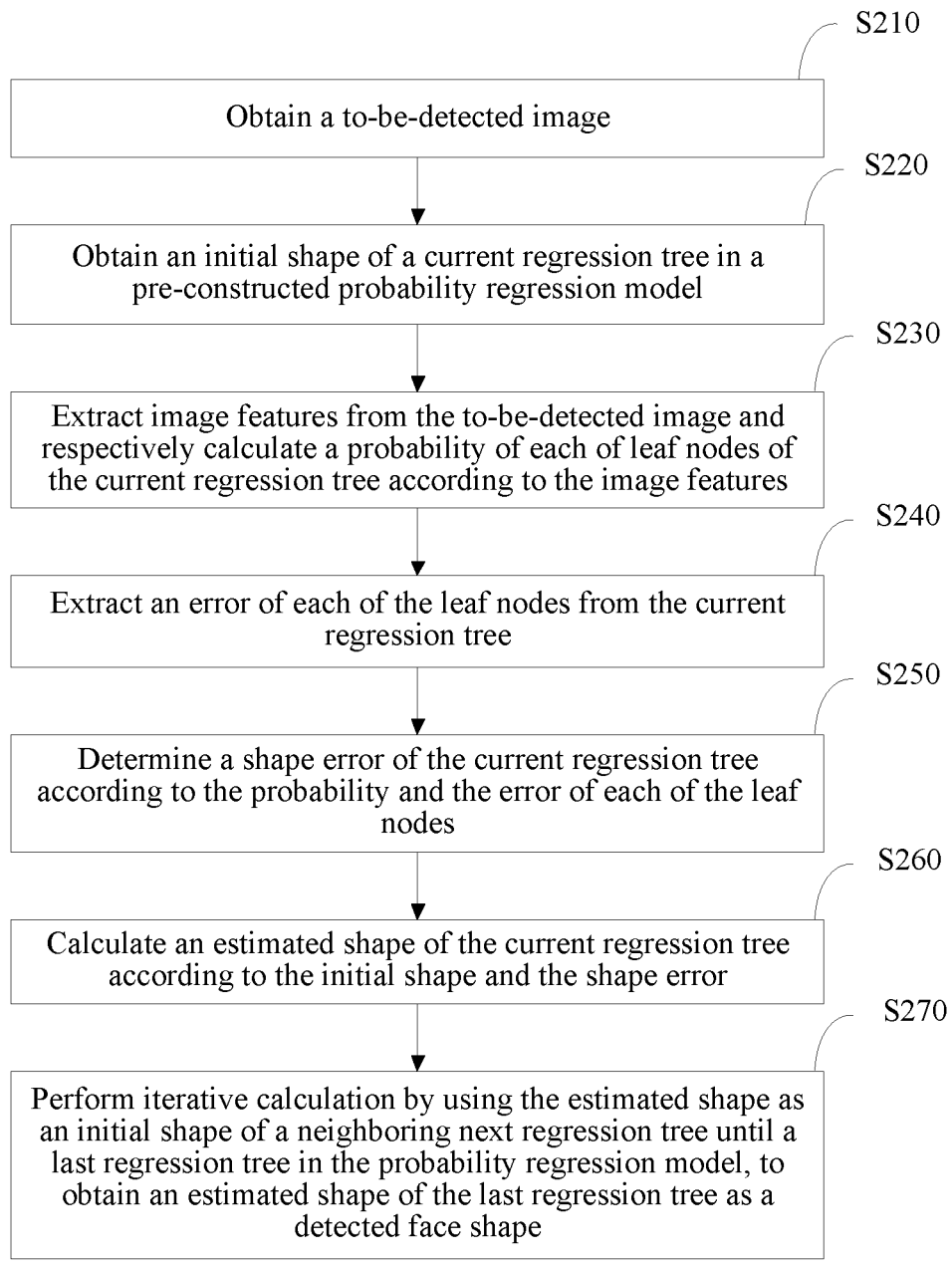
FIG. 2 is a schematic flowchart of a face detection method according to an embodiment of the present disclosure.

As shown in FIG. 2, in an embodiment, a face detection method that may be applied to a compute device in FIG. 1 is provided, and the method includes the followings.

S210: Obtain a to-be-detected image.

Figure 3:
FIG. 3 is a face shape diagram formed by feature points according to an embodiment of the present disclosure.

The to-be-detected image refers to an image in which a face shape needs to be detected. The face shape may include a facial contour and shape, and positions and shapes of facial features. The face shape may be represented by a position of each of feature points marked on a face, as shown in FIG. 3. FIG. 3 is a schematic diagram of a face shape formed by feature points according to an embodiment of the present disclosure. Each point with a number in FIG. 3 is a feature point and the face shape may be formed according to the position of each of the feature points. The features marked by numbers 1 to 17 represent a face contour shape, the features marked by numbers 18 to 27 represent positions and shapes of eyebrows, the feature points marked by numbers 28 to 37 represent a position and a shape of a nose, the feature points marked by numbers 37-46 represent positions and shapes of eyes, and the feature points marked by numbers 49 to 68 represent a position and a shape of a mouth.

In an embodiment, the computer device obtains a to-be-detected image. If the to-be-detected image is a color image, the color image may be transformed to a grayscale image according to a corresponding transformation matrix. The grayscale image refers to an image in which each color has only one sample color. The computer device may, according to image features of the grayscale image, roughly detects whether the to-be-detected image includes a face. If the to-be-detected image includes a face, the detected face may be extracted from the grayscale image and the extracted face is placed in a preset unit rectangular area. If the to-be-detected image includes a plurality of faces, the faces may be respectively extracted to place in the preset unit rectangular area, and then, face shapes are detected one by one.

Furthermore, the computer device may capture a to-be-detected image in real time through a camera or obtain a pre-stored to-be-detected image. The to-be-detected image may be a frame in a video stream, a static image, or the like.

S220: Obtain an initial shape of a current regression tree in a pre-constructed probability regression model.

The probability regression model includes cascaded random forests. The probability regression model may include multi-level random forests, each level of the random forests may include a plurality of regression trees, each level of the random forests and each regression tree under each level of the random forests are in a cascaded relationship, an estimated shape output by an upper level of the random forests is an initial shape of a neighboring lower level of the random forests, and in the same level of the random forests, an estimated shape outputted by a previous regression tree is an initial shape of a neighboring next regression tree. The regression tree divides a predicted space into several subsets by using a binary tree, each of leaf nodes in the regression tree is corresponding to a different divided area, and each image entering the regression tree is finally allocated onto a unique leaf node.

The computer device may obtain a pre-generated model file and parse the model file, re-constructs the cascaded probability regression model according to information contained in the model file, and detect a face shape in a to-be-detected face image according to the probability regression model. The information contained in the model file may include the number of levels of the random forests, the number of regression trees of each level of the random forests, a depth of each tree, node information of each of nodes in a regression tree, and so on.

Iterative calculation is performed on each level of the random forests in the probability regression model and each regression tree under each level of the random forests, to finally obtain a detected face shape. When performing the iterative calculation, the computer device needs to obtain the initial shape of the current regression tree in the probability regression model. The current regression tree refers to a regression tree of which an estimated shape is being calculated. Furthermore, the computer device parses the model file, and may further obtain, when constructing the probability regression model according to a sample image set, an average shape of each of sample images in the sample image set, and uses the average shape of each of the sample images in the sample image set as an initial shape of a first regression tree of a first level of random forests of the probability regression model.

S230: Extract image features from the to-be-detected image and respectively calculate a probability of each of the leaf nodes of the current regression tree according to the image features.

The computer device may extract the image features from the to-be-detected image according to corresponding node information contained in each of the nodes in the current regression tree. The node information is used to indicate a division rule of a corresponding node. Furthermore, the node information may include coordinate information of a division pixel pair. The computer device may extract, according to the coordinate information of the division pixel pair, image features from a corresponding position in the preset unit rectangular area in which the extracted faces are placed. The computer device may respectively calculate the probability of each of the leaf nodes according to the image features that are extracted from the to-be-detected image and are corresponding to each of the nodes of the current regression tree. A leaf node refers to a node with a degree being 0, has no sub-nodes, and may also be referred to as an end node.

S240: Extract an error of each of the leaf nodes from the current regression tree.

The computer device may read the error of each of the leaf nodes in the regression tree from the model file. The error of each of the leaf nodes refers to a difference value between an estimated shape obtained by calculating correspondingly to the leaf nodes and a true shape of the to-be-detected image, and the error of each of the leaf nodes may be obtained by calculating according to a large number of sample images in the sample image set when the probability regression model is established.

S250: Determine a shape error of the current regression tree according to the probability and the error of each of the leaf nodes.

The computer device may perform weighting and calculation according to the probability and the corresponding error of each of the leaf nodes of the current regression tree, respectively calculate a product of the probability of each of the leaf nodes and the corresponding error, and accumulate products obtained through calculation, to obtain the shape error of the current regression tree. The shape error of the current regression tree is a difference value between the calculated estimated shape of the current regression tree and the true shape of the to-be-detected image.

S260: Calculate the estimated shape of the current regression tree according to the initial shape and the shape error.

The computer device may accumulate the initial shape of the current regression tree and the shape error, to obtain the estimated shape of the current regression tree. Assuming that, for the current regression tree, the estimated shape is $s^k$, the initial shape is $s^{k-1}$, and the calculated shape error is $\Delta s^k$, $s^k = s^{k-1} + \Delta s^k$. $s^{k-1}$ may be a calculated estimated shape of a neighboring previous regression tree of the current regression tree.

S270: Perform iterative calculation by using the estimated shape as an initial shape of a neighboring next regression tree until a last regression tree in the probability regression model, to obtain an estimated shape of the last regression tree as a detected face shape.

After the estimated shape of the current regression tree is calculated, the estimated shape of the current regression tree may be used as the initial shape of a neighboring next regression tree. Steps S320 to S360 are performed repeatedly to obtain an estimated shape of the next regression tree, and then the estimated shape of the next regression tree is used as an initial shape of a further neighboring next regression tree . . . , and so on. The iterative calculation is performed in the probability regression model until the last regression tree of the last level of the random forest of the probability regression model, and a calculated estimated shape of the last regression tree of the last level of the random forest is the detected face shape. Each level of the random forest in the probability regression model and each regression tree under each level of the random forest are both approaching the true shape of the to-be-detected image. The iterative calculation is performed in the probability regression model according to the foregoing manner, to gradually approach the true shape of the to-be-detected image from the initial average shape of each of the sample images in the sample image set, to obtain the detected face image.

Figure 4A:
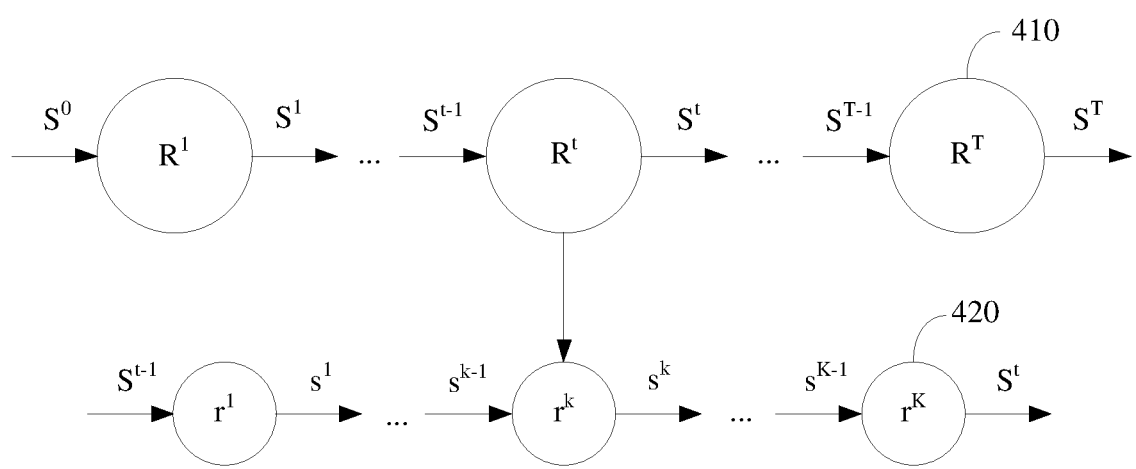
FIG. 4A is a schematic diagram of a probability regression model according to an embodiment of the present disclosure.

FIG. 4A is a schematic diagram of a probability regression model according to an embodiment of the present disclosure. As shown in FIG. 4A, the probability regression model includes a T-level random forest 410, an estimated shape of a previous level random forest $R^{t-1}$ is $S^{t-1}$ that is used as an initial shape input by a neighboring next level random forest $R^t$. Each level random forest 410 further includes K regression trees 420, an estimated shape output by a previous regression tree $r^{k-1}$ is $s^{k-1}$ that is used as an initial shape input by a neighboring next regression tree $r^k$. $S^0$ represents the average shape of each of the sample images in the sample image set obtained from the model file and is iteratively calculated for many times to gradually approach the true shape of the to-be-detected image, and an estimated shape $S^T$ calculated by a last level of the random forest $R^T$ is used as a detected face shape.

Figure 4B:
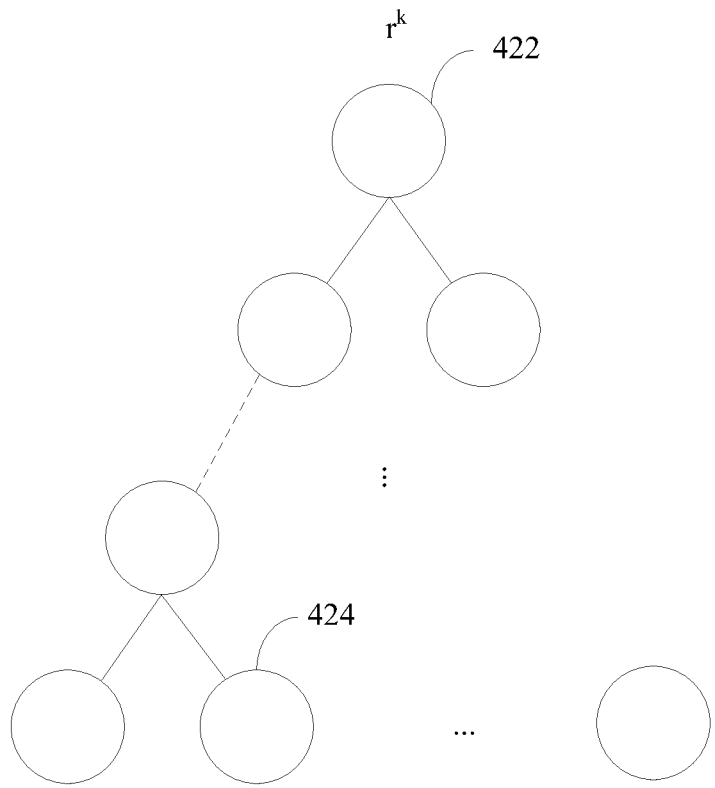
FIG. 4B is a schematic diagram of a regression tree according to an embodiment of the present disclosure.

FIG. 4B is a schematic diagram of a regression tree according to an embodiment of the present disclosure. As shown in FIG. 4B, the regression tree $r^k$ includes a plurality of nodes 422, the image features may be extracted from the to-be-detected image according to corresponding node information contained in each of the nodes 422, and a probability of each of leaf nodes 424 of the regression tree $r^k$ are respectively calculated according to the extracted image features, an error of each of the leaf nodes 424 is extracted from the regression tree $r^k$, a shape error of the regression tree $r^k$ is calculated according to the probability and the corresponding error of each of the leaf nodes 424, and then, an estimated shape $s^k$ of the regression tree $r^k$ is obtained according to the initial shape $s^{k-1}$ of the regression tree $r^k$ and the calculated shape error.

In the foregoing face detection method, the image features are extracted from the to-be-detected image, the probability of each of the leaf nodes of the current regression tree in the probability regression model is calculated, the shape error of the current regression tree is determined according to the probability and the error of each of the leaf nodes, to calculate the estimated shape of the current regression tree, the estimated shape is used as the initial shape of the neighboring next regression tree to perform iterative calculation, to gradually approach a true error and obtain an accurate face shape, a shape error of each of the regression trees is determined by the errors and probabilities of all the leaf nodes of the regress tree, to make the estimated shape be more stable and accurate and efficiently solve the problem of jitter of face feature points occurring in a video image sequence.

Figure 5:
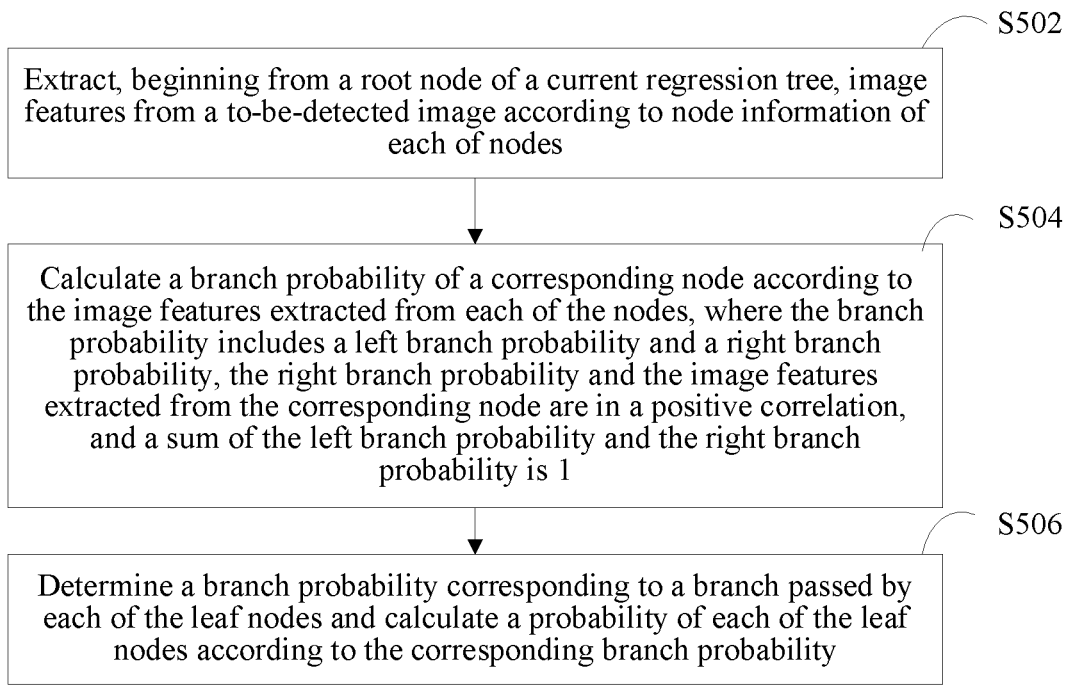
FIG. 5 is a flowchart of calculating a probability of each of leaf nodes of a current regression tree according to an embodiment of the present disclosure.

As shown in FIG. 5, in an embodiment, S330, that is, extract image features from the to-be-detected image and respectively calculate a probability of each of leaf nodes of the current regression tree according to the image features, includes the followings.

S502: Extract, beginning from a root node of the current regression tree, the image features from the to-be-detected image according to the node information of each of the nodes.

The regression tree may include a plurality of nodes and each of the nodes includes corresponding node information. The node information may include coordinate information of a division pixel pair, the division pixel pair refers to a pixel pair used by a node to divide a sample image, and the coordinate information of the division pixel pair includes a first pixel coordinate and a second pixel coordinate of the pixel pair. The computer device may extract, beginning from the root node of the current regression tree, a first grayscale value and a second grayscale value of a corresponding position from the to-be-detected image according to the coordinate information of the division pixel pair contained in each of the nodes, and according to the first grayscale value and the second grayscale value, calculate a grayscale difference value as an image feature of the to-be-detected image matching the corresponding node.

Furthermore, the computer device may extract, according to the coordinate information of the division pixel pair contained in each of the nodes, the first grayscale value and the second grayscale value of the corresponding position from the preset unit rectangular area in which the extracted faces are placed, and according to the first grayscale value and the second grayscale value, calculate the grayscale difference value as the image feature of the to-be-detected image matching the corresponding node. It may be understood that, the image feature may also be other feature information, for example, a gradient feature and a texture feature of a pixel, and is not limited to the grayscale difference value.

S504: Calculate a branch probability of a corresponding node according to the image features extracted from each of the nodes, where the branch probability includes a left branch probability and a right branch probability, the right branch probability and the image features extracted from the corresponding node are in a positive correlation, and a sum of the left branch probability and the right branch probability is 1.

The node information contained in each of the nodes may further include a corresponding division threshold and a corresponding branch probability. The division threshold refers to an image feature threshold used by a node to divide a sample image. Each of the nodes of the regression tree, except the leaf nodes, can be split into a left branch node and a right branch node. The branch probability refers to a probability that a sample image on a node is allocated to the left branch node or the right branch node of the node and may include a left branch probability and a right branch probability. The left branch probability is used to represent a probability that the sample image allocated to the node is divided to the left branch node of the node and the right branch probability is used to represent a probability that the sample image allocated to the node is divided to the right branch node of the node.

In one embodiment, the right branch probability of each of the nodes may be calculated according to the following formula:

$$p_r = \frac{1}{1+e^{-\alpha(g-th)}}. \tag{1}$$

$p_r$ represents a right branch probability of a node, $\alpha$ represents a constant, the value of which is usually in a range of (0.05, 0.3], g represents a grayscale value corresponding to the node in the to-be-detected image, and th is a division threshold corresponding to the node. The right branch probability $p_r$ of the node and the extracted grayscale value g corresponding to the node are in a positive correlation. The sum of the left branch probability and the right branch probability of the node is 1, and the left branch probability is $p_l=-1-p_r$.

The computer device may calculate a right branch probability and a left branch probability of each of the nodes in the current regression tree except the leaf nodes. The computer device may first calculate a left branch probability and a right branch probability of a root node by beginning from the root node, then, calculate a left branch probability and a right branch probability of a left branch node generated by splitting of the root node, calculate a left branch probability and a right branch probability of a right branch node generated by splitting of the root node, . . . and so on, a branch probability of each of the nodes on each level of the current regression tree is calculated gradually in sequence, and calculation is not stopped until the depth reaches a last level.

S506: Determine a branch probability corresponding to a branch passed by each of the leaf nodes and calculate a probability of each of the leaf nodes according to the determined corresponding branch probability.

The branch probability of the branch passed by each of the leaf nodes in the current regression tree may be determined respectively and the branch probabilities corresponding to the branches passed by the leaf nodes are multiplied, to obtain the probabilities of the corresponding leaf nodes.

Figure 6:
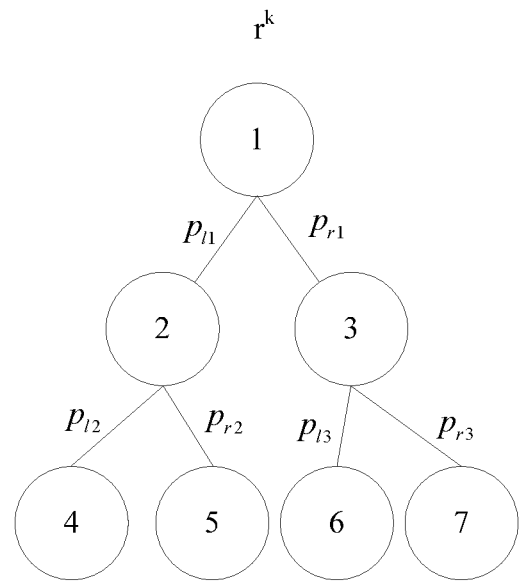
FIG. 6 is a schematic diagram of a regression tree according to another embodiment of the present disclosure.

The step of calculating each of the leaf nodes of the regression tree is described by using an example. FIG. 6 is a schematic diagram of a regression tree according to another embodiment of the present disclosure. As shown in FIG. 6, the regression tree $r^k$ includes 7 nodes. A node 1 is a root node, the node 1 is split into a node 2 and a node 3, the node 2 is further split into a node 4 and a node 5, the node 3 is split into a node 6 and a node 7, and the nodes 4 to 7 are leaf nodes. The computer device may, according to the formula (1), respectively calculate the branch probability of each of the nodes of the regression tree $r^k$ except the leaf nodes. The computer device, from the root node 1, calculates a right branch probability $p_{r1}$ and a left branch probability $p_{l1}=1-p_{r1}$ of the root node 1, then calculates a right branch probability $p_{r2}$ and a left branch probability $p_{l2}=1-p_{r2}$ of the left branch node 2 generated by splitting of the root node 1, and calculates a right branch probability $p_{r3}$ and a left branch probability $p_{l3}=1-p_{r3}$ of the branch node 3 generated by splitting of the root node 1. The branch probability corresponding to the branch passed by the leaf node 4 includes the left branch probability $p_{l1}$ of the node 1 and the left branch probability $p_{l2}$ of the node 2, and therefore, the probability of the leaf node 4 is $p_{l1}*p_{l2}$. The branch probability corresponding to the branch passed by the leaf node 5 includes the left branch probability $p_{l1}$ of the node 1 and the right branch probability $p_{r2}$ of the node 2, and therefore, the probability of the leaf node 5 is $p_{l1}*p_{r2}$. The branch probability corresponding to the branch passed by the leaf node 6 includes the right branch probability $p_{r1}$ of the node 1 and the left branch probability $p_{l3}$ of the node 3, and therefore, the probability of the leaf node 6 is $p_{r1}*p_{l3}$. The branch probability corresponding to the branch passed by the leaf node 7 includes the right branch probability $p_{r1}$ of the node 1 and the right branch probability $p_{r3}$ of the node 3, and therefore, the probability of the leaf node 7 is $p_{r1}*p_{r3}$.

In one embodiment, the probability of each of the leaf nodes of the regression tree may be calculated according to the image features of the to-be-detected image, so that when the face shape of the to-be-detected image is detected according to the probability regression model, the shape error of each regression tree is determined by the errors and probabilities of all the leaf nodes of the regression tree, and thus, the estimated shape is more stable and accurate, and the problem of jitter of face feature points occurring in a video image sequence may be solved efficiently.

In an embodiment, after S310, that is, obtaining a to-be-detected image, the method further includes: performing median filtering processing on the to-be-detected image.

The computer device obtains the to-be-detected image and may perform de-noising and filtering processing on the to-be-detected image. In one embodiment, the computer device transforms the to-be-detected image to a grayscale image, and may perform median filtering processing on the grayscale image. Median filtering is a non-linear smoothing technology, may replace a pixel value at any point in the grayscale image with a median of a pixel value of each point in an area where the point is located, make the pixel values of points surrounding the point approach a true value, to eliminate isolated noise points in the to-be-detected image. It should be understood that, not only the median filtering may be used to de-noise the to-be-detected image, but also other filtering methods, such as mean filtering and wavelet transform filtering, may also be used to perform de-noising processing.

Figure 7:
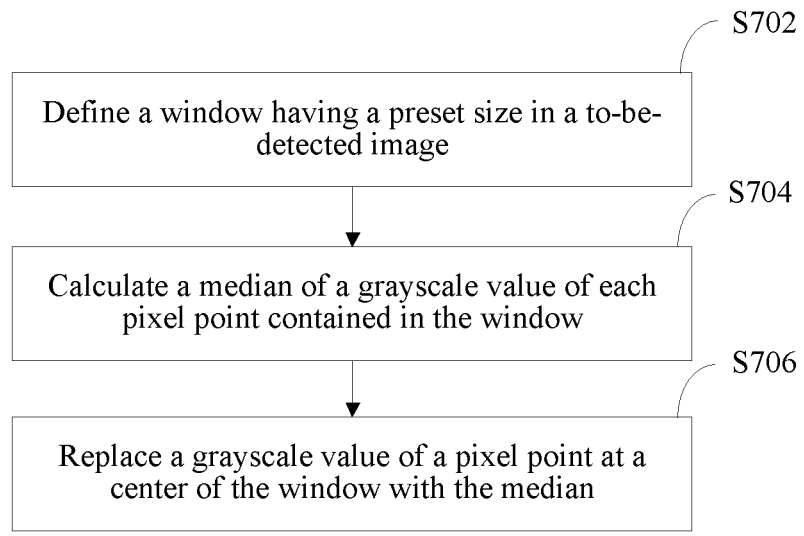
FIG. 7 is a flowchart of performing median filtering processing on a to-be-detected image according to an embodiment of the present disclosure.

As shown in FIG. 7, in an embodiment, the performing median filtering processing on the to-be-detected image further includes the followings.

S702: Define a window having a preset size in the to-be-detected image.

The computer device may define the window having the preset size in the grayscale image transformed from the to-be-detected image. The preset size may be a size N*N, where N is an odd number, and for example, may be 5 or 7. N cannot be too large or small. When N is too large, some details of the grayscale image may be lost, causing a distorted image, and when N is too small, de-noising effects may be caused to be non-obvious.

S704: Calculate a median of a grayscale value of each pixel point contained in the window.

A grayscale value of each of pixel points in the window having the preset size defined in the grayscale image may be extracted, and the grayscale value of each of pixel points may be arranged in a descending sequence, to generate a number sequence, and a grayscale value at a middle position of the number sequence, that is, a median of the grayscale value of each pixel point contained in the window, is obtained.

S706: Replace a grayscale value of a pixel point at a center of the window with the median.

The computer device may replace the grayscale value of the pixel point at the center of the defined window having the preset size in the grayscale image with the calculated median of the window, to finish median filtering. The median filtering processing may be repeated in the window defined at different positions in the grayscale image for many times. Furthermore, the median filtering processing may be performed on a preset unit rectangular area containing extracted faces, a window having a preset size is defined in the unit rectangular area, and a grayscale value of a pixel point at a center of the window is replaced with a median of the grayscale value of each of the pixel points contained in the window.

In one embodiment, after the to-be-detected image is obtained, filtering processing may be performed on the to-be-detected image, to reduce noises in the to-be-detected image and weaken noise influences of two consecutive frame images caused by a change of hardware and environmental illumination in the video image sequence, so that the finally detected face shape is more stable and accurate.

In an embodiment, before S310, that is, obtaining the to-be-detected image, the method further includes constructing a cascaded regressive probability regression model according to the sample image set.

The sample image set includes a large number of sample images, each of the sample images is an image with feature points marked on a face area, and the face shape of the sample image is represented by coordinate information corresponding to the feature points. Since resolutions and postures of different sample images are different, each of the sample images in the sample image set needs to be normalized. The features of each of the sample images is scaled and translated at the same degree, to map a face shape of each of the sample images into a unified standard matrix and obtain corresponding shape information of each of the sample images in the standard matrix, including coordinate information corresponding to each of the feature points. The unified standard matrix may be a 1*1 unit matrix, and may also be a matrix having another size. Each of the sample images in the sample image set is normalized, to ensure the matrix where the feature points on each of the sample images are located is consistent, to facilitate training, and to construct the probability regression model.

In an embodiment, to prevent the sample images in the sample image set from being overfitting, the face shape of each of the sample images in the sample image set may be calculated again. Overfitting means making assumption be excessively strict to obtain consistent assumption. When the sample images are over fitting, accuracy of detecting a face shape by a constructed probability regression model is poor. The computer device may group the sample images in the sample image set, for example, grouping all the sample images into a plurality of groups and each group contains M sample images, where M is an integer greater than 2.

The computer device may circulate the following processing on the grouped sample images: selecting any sample image, randomly selecting, from a group to which the selected sample image belongs, a preset number of sample images, weighting and calculating the preset number of sample images to obtain a new sample image, and replacing the selected sample image with the new sample image. For example, any sample image $I_i$ is selected, the sample image $I_i$ belongs to the third group, two sample images $I_k$ and $I_j$ are randomly selected from the third group, face shapes of the sample images $I_k$ and $I_j$ are weighted and calculated according to a preset weight value, to obtain a new face shape, and the face shape of the sample image $I_i$ is replaced with the new face shape. It may be understood that, the preset number may further be, but is not limited to, 3 or 4. The preset weight value may also be calculated according to an actual demand, and alternatively, mean calculation may be performed on the preset number of sample images, to obtain the face shape of the new sample image and perform replacement. The computer device may perform sample replacement for a second number of times. The second number of times may be set according to an actual demand and a number of sample images, for example, the computer device circulates sample replacement on the grouped sample images for 100 or 150 times.

Figure 8:
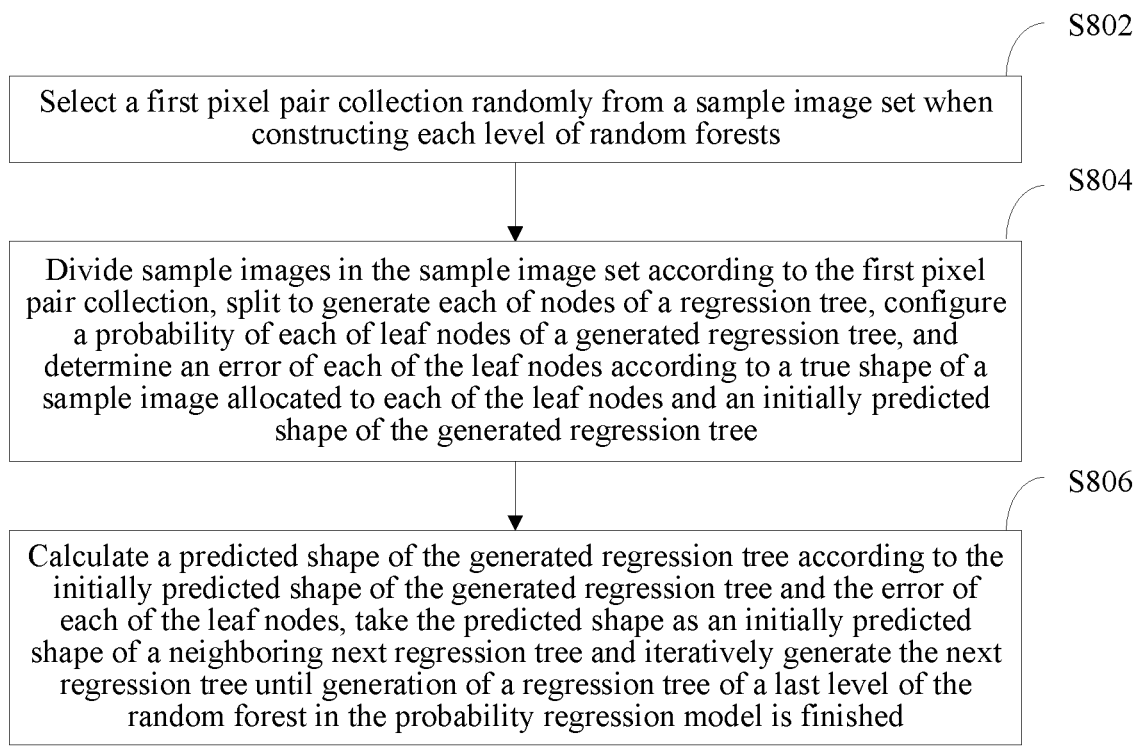
FIG. 8 is a flowchart of constructing a cascaded regressive probability regression model according to an embodiment of the present disclosure.

As shown in FIG. 8, in an embodiment, the constructing a cascaded regressive probability regression model according to the sample image set includes the followings.

S802: Select a first pixel pair collection randomly from the sample image set when constructing each level of the random forests.

The probability regression model includes cascaded random forests, the probability regression model may include multi-level random forests, and each level of the random forests may include a plurality of regression trees. Generating the probability regression model is an iterative generation process, the random forest is generated level by level, and the regression trees under each level of the random forests are generated one by one. When each level of the random forests is constructed, the computer device needs to randomly select a first pixel pair collection from the sample image set, the first pixel pair collection may include N pairs of pixel points, each pixel pair includes coordinate information of two randomly selected pixel points. N may be a larger integer, such as 300, 400, and 500.

Furthermore, the computer device may randomly select the first pixel pair collection from the sample image set according to the following formula (2).

$$P=e^{-\lambda \|u-v\|} \qquad (2).$$

P is a factor for obtaining pixel points distributed at the edges of facial features of a face or near a face contour, $\lambda$ is a general coefficient, u and V respectively represent coordinate information of two randomly selected pixel points, the pixel pairs randomly selected from the sample image set may be sifted according to the formula (2), when P calculated according to the randomly selected pixel pair is less than a preset threshold $T_p$, the pixel pair is placed in the first pixel pair collection. The first pixel pair is randomly selected according to the formula (2), the pixel points distributed at the edges of facial features of a face or near a face contour may be selected without calculating a gradient difference of the selected pixel pair, the calculation manner is simple and quick and the constructed probability regression model is more accurate.

S804: Divide sample images in the sample image set according to the first pixel pair collection, split to generate each of nodes of a regression tree, configure a probability of each of leaf nodes of a generated regression tree, and determine an error of each of the leaf nodes according to a true shape of a sample image allocated to each of the leaf nodes and an initially predicted shape of the generated regression tree.

When the computer device constructs each level of the random forest, a plurality of regression trees under the corresponding random forest may be constructed and generated according to the randomly selected first pixel pair collection. When each regression tree is constructed and generated, the sample images in the sample image set are divided by beginning from the root node of the regression tree, each of the nodes of the regression tree is generated through splitting, and each of the sample images in the sample image set may be finally divided to a unique leaf node.

When the sample images in the sample image set are divided to generate the regression tree, probabilities of leaf nodes of the generated regression tree may be configured. When each of the nodes of the regression tree is generated through splitting, a corresponding branch probability is configured for a node that performs division of sample images, the node that performs division of sample images may be split into a left branch node and a right branch node, the branch probability may include a left branch probability and a right branch probability that are respectively corresponding to the left branch and the right branch of the node that performs division of sample images. A right branch probability $p_r$ of each of the nodes that perform division of sample images may be configured according to the formula (1), the right branch probability and image features of a sample image extracted at a corresponding node are in a positive correlation, and a sum of the left branch probability and the right branch probability of a node that performs division of sample images is 1. After the computer device configures a corresponding branch probability for each of the nodes of the generated regression tree except the leaf nodes, the probability of each of the leaf nodes may be configured as a product of branch probabilities corresponding to branches passed by the leaf node.

The computer device may iteratively generate each level of the random forest and each regression tree under each level of the random forest, and finally construct a cascaded probability regression model. When the regression trees are generated iteratively, initially predicted shapes of the generated regression trees need to be obtained. The computer device may obtain an average shape of all sample images in the sample image set and use the average shape as an initially predicted shape of a first regression tree in a generated first level of the random forest. Each of the sample images in the sample image set is finally allocated to a unique leaf node of the generated regression tree, and an error of a corresponding leaf node may be determined according to a true shape of a sample image allocated to each of the leaf nodes and the initially predicted shape of the generated regression tree. The true shape of the sample image is a face shape represented by the sample image through the feature points.

Furthermore, difference values between the true shape of the sample image allocated to each of the leaf nodes and the initially predicted shape are calculated respectively, and a mean value, that is, the error of the leaf node, of the difference values between the true shapes of the sample images on the corresponding leaf node and the initially predicted shape is obtained. For example, the leaf node 4 of the regression tree is allocated with two sample images, the difference values between the true shapes of the two sample images and the initially predicted shape of the regression tree are calculated respectively to be $x_1$ and $x_2$, and an error of the leaf node 4 is $(x_1+x_2)/2$.

S806: Calculate a predicted shape of the generated regression tree according to the initially predicted shape of the generated regression tree and the error of each of the leaf nodes, take the predicted shape as an initially predicted shape of a neighboring next regression tree and iteratively generate the next regression tree until generation of a regression tree of a last level of the random forest in the probability regression model is finished.

Accumulation of the error of each of the leaf nodes of the generated regression tree is an error of the generated regression tree, and the error of the generated regression tree and the initially predicted shape are accumulated to obtain a predicted shape of the generated regression tree and the predicted shape is taken as an initially predicted shape of a neighboring next regression tree, S804 is repeatedly performed to generate the next regression tree, S802 and S804 are repeatedly performed to generate a next level of the random forest, until generation of the regression trees of a last level of the random forest in the probability regression model is finished. Accumulation of an error of each regression tree under each level of the random forest in the generated probability model approaches a true error of a true shape and an average shape of each of the sample images in the sample image set, each level of the random forest and each tree under each level of the random forest are both further prediction on the true error of the true shape and the average shape of each of the sample images.

In one embodiment, the cascaded probability regression model is constructed and generated according to each of the sample images in the sample image set, each level of the random forest in the probability regression model and each regression tree under each level of the random forest are both further prediction on the true error, when face detection is performed through the probability regression model, the shape error of each of the regression trees is determined according to the errors and the probabilities of all the leaf nodes of the regression tree, so that the estimated shape is more stable and accurate, and the problem of jitter of face feature points occurring in a video image sequence may be solved efficiently.

Figure 9:
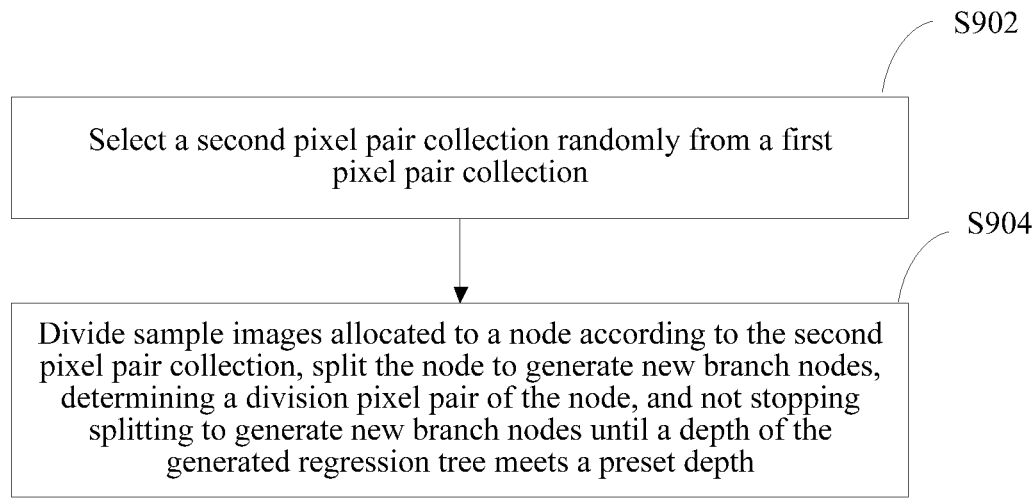
FIG. 9 is a flowchart of dividing sample images in a sample image set to split to generate each of nodes of a regression tree according to an embodiment of the present disclosure.

As shown in FIG. 9, in an embodiment, the dividing sample images in the sample image set according to the first pixel pair collection, splitting to generate each of nodes of a regression tree includes: performing the following processing on a root node and each of the nodes that are generated by splitting by beginning from the root node of the regression tree.

S902: Select a second pixel pair collection randomly from the first pixel pair collection.

When each of the nodes is split by beginning from the root node of the regression tree, K pixel pairs need to be randomly selected from the first pixel pair collection, to generate a second pixel pair collection. K is an integer; K is a value that is less than N that represents the number of pixel pairs in the first pixel pair collection. For example, when N is 400, K may be 15, 20, 30, or the like.

S904: Divide sample images allocated to a node according to the second pixel pair collection, split the node to generate new branch nodes, determining a division pixel pair of the node, and not stopping splitting to generate new branch nodes until a depth of the generated regression tree meets a preset depth.

Each time when the computer device splits a regression data node into new branch nodes, the sample images allocated to the node that is being split are divided again. The depth of the regression tree may be preset according to an actual demand. The depth of the regression tree refers to a serial number of a layer where a deepest node in the regression tree is located, for example, a serial number of a layer where the root node is located is 1, a serial number of a layer where the branch nodes generated by splitting of the root node are located is 2, and a serial number of a layer where the branch nodes generated by splitting of the branch nodes generated by splitting of the root node are located is 3.

The computer device may divide the sample images allocated to each of the nodes according to the second pixel pair collection randomly selected from the first pixel pair collection, split the corresponding node to generate new branch nodes, and at the same time, determine the division pixel pair of the node, and do not stop splitting to generate new branch nodes until the depth of the generated regression tree meets the preset depth.

Figure 10:
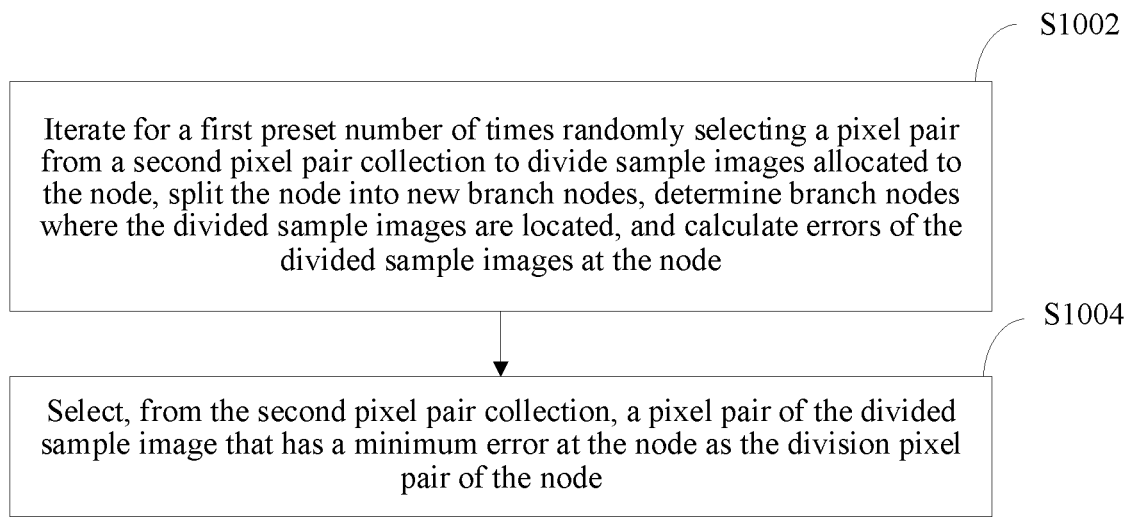
FIG. 10 is a flowchart of determining a division pixel pair of each of nodes according to an embodiment of the present disclosure.

As shown in FIG. 10, in an embodiment, S904 includes the followings.

S1002: Looping or iterating for a first preset number of times: randomly selecting a pixel pair from the second pixel pair collection to divide the sample images allocated to the node, split the node into new branch nodes, determine branch nodes where the divided sample images are located, and calculate errors of the divided sample images at the node.

For the division pixel pair of the node, after the sample images allocated to the node are divided according to the division pixel pair, the sample images have a minimum error at the node. The computer device may randomly select a pixel pair from the second pixel pair collection, extract image features from a position corresponding to each of the sample images according to the pixel pair, compare the extracted image features with a preset threshold, and allocate the sample images to the left branch node or the right branch node of the node according to a comparison result. After the samples are divided, the left branch error may be calculated according to the sample images allocated to the left branch node and the right branch error may be calculated according to the sample images allocated to the right branch node, to determine the error of the node under the selected pixel pair. The computer device may repeat selecting pixels randomly from the second pixel pair collection to perform division for the first preset number of times, such as 10 times, 15 times, or 20 times, and the first preset number of times may be determined according to the number of pixel pairs included in the second pixel pair collection.

S1004: Select, from the second pixel pair collection, a pixel pair of the divided sample image that has a minimum error at the node as the division pixel pair of the node.

The computer device may circulate randomly selecting the pixel pair from the second pixel pair collection for many times, divide the sample images allocated to the node, and calculate the error of the node under the selected pixel pair, to select the pixel pair of the divided sample image that has a minimum error at the node as the division pixel pair of the node.

The process for generating the regression tree is described according to FIG. 6. As shown in FIG. 6, assuming that the sample image set has 1000 sample images. 20 pixel pairs are randomly selected from the first pixel pair collection by beginning from the root node 1, to generate the second pixel pair collection, selecting a pixel pair from the 20 pixel pairs randomly to divide the 1000 sample images is circulated for many times, and the errors of the divided sample images at the root node 1 are calculated, and the pixel pair ($u_1$, $v_1$) having a minimum error is selected as the division pixel pair of the root node 1. According to the division pixel pair ($u_1$, $v_1$), the 1st to 500th sample images are allocated to the left branch node 2 of the root node 1, and the 501st to 1000th sample images are allocated to the right branch node 3 of the root node 1. Then, the 1st to 500th sample images allocated to the node 2 are further divided, a division pixel pair ($u_2$, $v_2$) of the node 2 is determined, the 1st to 250th sample images are allocated to the left branch node 4 of the node 2, and the 251st to 500th sample images are allocated to the right branch node 5 of the node 2. Then, the 501st to 1000th sample images allocated to the node 3 are further divided, a division pixel pair ($u_3$, $v_3$) of the node 3 is determined, the 501st to 750th sample images are allocated to the left branch node 6 of the node 3, and the 751st to 1000th sample images are allocated to the right branch node 7 of the node 3. It may be understood that, the above example is only used to describe the process for generating the regression tree. During an actual process for generating the regression tree, when the sample images are divided, a number of the sample images divided to the left branch node and a number of the sample images divided to the right branch node are not always equal. The sample images divided to the left branch node and the sample images divided to the right branch node have no sequential relationship, and each sample image is divided entirely depending on the division pixel pair of the node.

In one embodiment, the division pixel pair of each of the nodes in the regression tree is determined and the sample images are divided according to the division pixel pair, to ensure that each of the nodes has a minimum error and the constructed probability regression model is more accurate.

Figure 11:
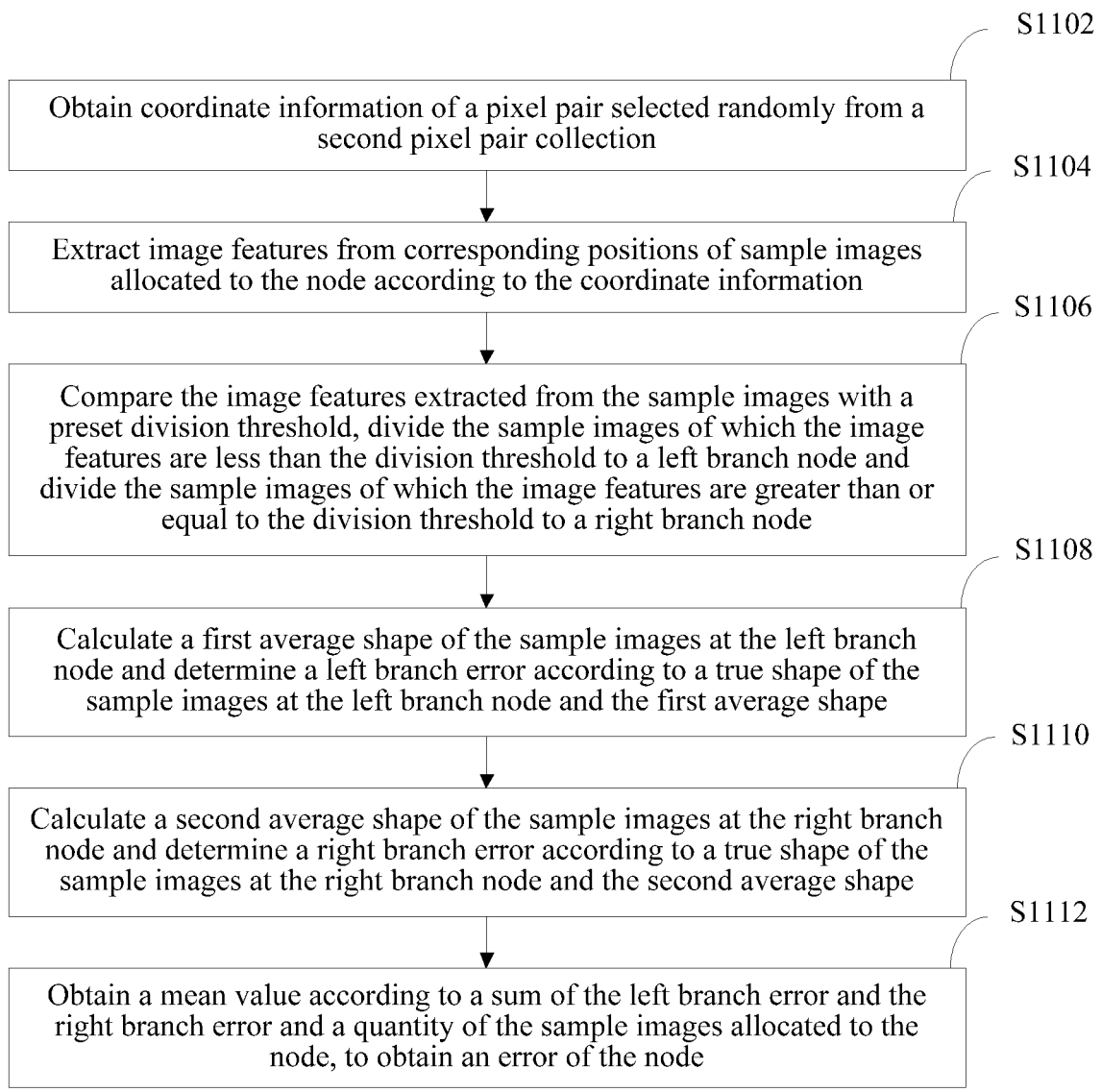
FIG. 11 is a flowchart of calculating an error of a divided sample image at a node according to an embodiment of the present disclosure.

As shown in FIG. 11, in an embodiment, S1002, that is, repeating for the first preset number of times randomly selecting a pixel pair from the second pixel pair collection to divide the sample images allocated to the node, split the node into new branch nodes, determine branch nodes where the divided sample images are located, and calculate errors of the divided sample images at the node, includes the following steps:

S1102: Obtain coordinate information of a pixel pair selected randomly from the second pixel pair collection.

S1104: Extract image features from corresponding positions of the sample images allocated to the node according to the coordinate information.

The computer device may, when splitting each of the nodes by beginning from the root node of the regression tree, randomly select a pixel pair from the second pixel pair collection, obtain coordinate information of two pixel points contained in the selected pixel pair, and according to the coordinate information, extract corresponding image features from a corresponding position of each of the sample images allocated to the node that is split. In one embodiment, a third grayscale value and a fourth grayscale value are respectively extracted from the corresponding positions of the sample images allocated to the node, and a grayscale difference value between the third grayscale value and the fourth grayscale value is used as the image feature of the sample images at the node.

S1106: Compare the image features extracted from the sample images with a preset division threshold, divide the sample images of which the image features are less than the division threshold to a left branch node and divide the sample images of which the image features are greater than or equal to the division threshold to a right branch node.

The division threshold may be a preset fixed image feature threshold or a division threshold randomly selected from a preset image feature numeral range. The computer device may compare the image features corresponding to the sample images allocated to the node with the division threshold, divide the sample images of which the image features are less than the division threshold to the left branch node and divide the sample images of which the image features are greater than or equal to the division threshold to the right branch node. It may be understood that, alternatively, the sample images of which the image features are less than the division threshold may be divided to the right branch node and the sample images of which the image features are greater than or equal to the division threshold may be divided to the left branch node.

S1108: Calculate a first average shape of the sample images at the left branch node and determine a left branch error according to a true shape of the sample images at the left branch node and the first average shape.

A mean value is obtained according to the true shape of each of the sample images allocated to the left branch node of the node, to obtain the first average shape, difference values between the true shape of each of the sample images allocated to the left branch node and the first average shape are calculated respectively, and the difference values between the true shape of each of the sample images allocated to the left branch node and the first average shape are accumulated, to obtain the left branch error of the node.

S1110: Calculate a second average shape of the sample images at the right branch node and determine a right branch error according to a true shape of the sample images at the right branch node and the second average shape.

A mean value is obtained according to the true shape of each of the sample images allocated to the right branch node of the node, to obtain the second average shape, difference values between the true shape of each of the sample images allocated to the right branch node and the second average shape are calculated respectively, and the difference values between the true shape of each of the sample images allocated to the right branch node and the second average shape are accumulated, to obtain the right branch error of the node.

S1112: Obtain a mean value according to a sum of the left branch error and the right branch error and a number of the sample images allocated to the node, to obtain an error of the node.

The computer device may calculate, under the randomly selected pixel pair, the left branch error and the right branch error of the node that is being split, obtain a sum of the left branch error and the right branch error, divide the sum of the left branch error and the right branch error by the number of the sample images allocated to the node, to obtain the error of the node. Regarding each of the nodes of the regression tree, the second pixel pair collection is randomly selected from the first pixel pair collection, the randomly selecting a pixel pair from the second pixel pair collection is circulated for many times, the errors of the corresponding nodes under the selected pixel pair is calculated according to steps S1102 to S1112, and then, a pixel pair having a minimum error is used as the division pixel pair of the node.

In an embodiment, after the cascaded probability regression model is constructed and generated according to the sample images in the sample image set, a corresponding model file may be generated, the model file stores information such as a number of levels of the random forest contained in the probability regression model, a number of the regression trees under each level of the random forest, a depth of each of the regression trees, a division pair pixel, a division threshold and a configured branch probability of each of nodes in each of the regression trees, and a probability and an error configured for each of the leaf nodes.

In one embodiment, the error of the node under the randomly selected pixel pair may be calculated, to determine the division pixel pair of each of the nodes in the regression tree, and the sample images are divided according to the division pixel pair, to ensure that each of the nodes has a minimum error, so that the constructed probability regression mode is more accurate.

In an embodiment, a method for constructing a face detection model is provided, and the method includes: constructing a cascaded regressive probability regression model according to a sample image set, the probability regression model including a multi-level random forest, and each level of the random forest including a plurality of regression trees.

In an embodiment, the constructing a cascaded regressive probability regression model according to a sample image set includes the following steps: selecting a first pixel pair collection randomly from the sample image set when constructing each level of the random forest; dividing sample images in the sample image set according to the first pixel pair collection, splitting to generate each of nodes of a regression tree, configuring a probability of each of leaf nodes of a generated regression tree, and determining an error of each of the leaf nodes according to a true shape of a sample image allocated to each of the leaf nodes and an initially predicted shape of the generated regression tree; and calculating a predicted shape of the generated regression tree according to the initially predicted shape of the generated regression tree and the error of each of the leaf nodes, taking the predicted shape as an initially predicted shape of a neighboring next regression tree and iteratively generating the next regression tree till generation of a regression tree of a last level of the random forest in the probability regression model is finished.

In an embodiment, the configuring a probability of each of leaf nodes of a generated regression tree includes the following steps: configuring, when splitting to generate each of the nodes of the regression tree, a corresponding branch probability for a node on which sample images are divided, where the branch probability includes a left branch probability and a right branch probability, the right branch probability and image features of the sample images are in a positive correlation, and a sum of the left branch probability and the right branch probability is 1; and configuring the probability of each of the leaf nodes of the generated regression tree to be a product of branch probabilities corresponding to branches passed by the leaf nodes.

In the method for constructing a face detection model, the cascaded regressive probability regression model is constructed according to the sample image set, the sample images in the sample image set are divided according to the randomly selected first pixel pair collection, each of the nodes of the regression tree is generated through splitting, the probability of each of the leaf nodes of the generated regression tree is configured, and the error of each of the leaf nodes is determined, to obtain the predicted shape of the generated regression tree, and then, the predicted shape is used as an initially predicted shape of a neighboring next regression tree to iteratively generate the next regression tree. In the probability regression model, each level of the random forest and each of the regression trees under each level of the random forest are both further prediction on the true error. When face detection is performed through the probability regression model, the shape error of each of the regression trees is determined by the errors and probabilities of all the leaf nodes of the regress tree, to make the estimated shape be more stable and accurate and efficiently solve the problem of jitter of face feature points occurring in a video image sequence.

In an embodiment, the dividing sample images in the sample image set according to the first pixel pair collection, splitting to generate each of nodes of a regression tree includes the followings.

Perform the following processing on a root node and each of the nodes that are generated by splitting by beginning from the root node of the regression tree: selecting a second pixel pair collection randomly from the first pixel pair collection; and dividing sample images allocated to a node according to the second pixel pair collection, splitting the node to generate new branch nodes, determining a division pixel pair of the node, and not stopping splitting to generate new branch nodes until a depth of the generated regression tree meets a preset depth.

In an embodiment, the dividing sample images allocated to a node according to the second pixel pair collection, splitting the node to generate new branch nodes, determining a division pixel pair of the node, and not stopping splitting to generate new branch nodes until a depth of the generated regression tree meets a preset depth includes the following steps: circulating randomly selecting a pixel pair from the second pixel pair collection to divide the sample images allocated to the node for a first preset number of times, splitting the node into new branch nodes, determining branch nodes where the divided sample images are located, and calculating errors of the divided sample images at the node; and selecting, from the second pixel pair collection, a pixel pair of the divided sample image that has a minimum error at the node as the division pixel pair of the node.

In one embodiment, the division pixel pair of each of the nodes in the regression tree is determined and the sample images are divided according to the division pixel pair, to ensure that each of the nodes has a minimum error and the constructed probability regression model is more accurate.

In an embodiment, the circulating randomly selecting a pixel pair from the second pixel pair collection to divide the sample images allocated to the node for a first preset number of times, splitting the node into new branch nodes, determining branch nodes where the divided sample images are located, and calculating errors of the divided sample images at the node includes the following steps: obtaining coordinate information of a pixel pair selected randomly from the second pixel pair collection; extracting image features from corresponding positions of the sample images allocated to the node according to the coordinate information; comparing the image features extracted from the sample images with a preset division threshold, dividing the sample images of which the image features are less than the division threshold to a left branch node and dividing the sample images of which the image features are greater than or equal to the division threshold to a right branch node; calculating a first average shape of the sample images at the left branch node and determining a left branch error according to a true shape of the sample images at the left branch node and the first average shape; calculating a second average shape of the sample images at the right branch node and determining a right branch error according to a true shape of the sample images at the right branch node and the second average shape; and obtaining a mean value according to a sum of the left branch error and the right branch error and a number of the sample images allocated to the node, to obtain an error of the node.

In one embodiment, the error of the node under the randomly selected pixel pair may be calculated, to determine the division pixel pair of each of the nodes in the regression tree, and the sample images are divided according to the division pixel pair, to ensure that each of the nodes has a minimum error, so that the constructed probability regression mode is more accurate.

In an embodiment, a computer device is further provided. An internal structure of the computer device is shown in FIG. 1. The computer device includes a face detection apparatus, the face detection apparatus includes various modules, and each module may be all or partially implemented by software, hardware, or a combination thereof.

Figure 12:
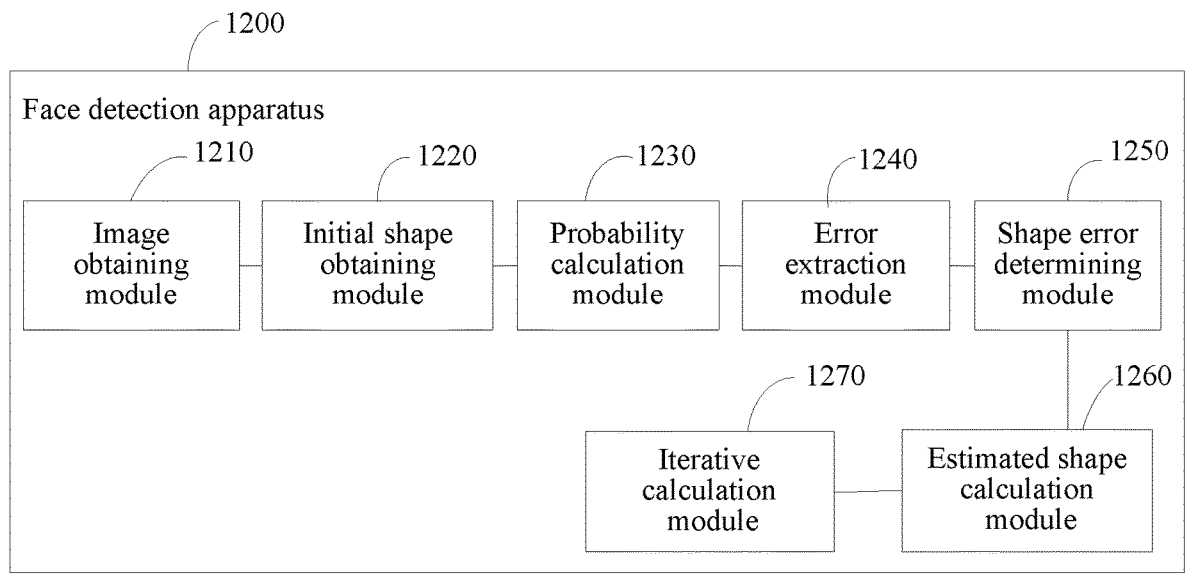
FIG. 12 is a block diagram of a face detection apparatus according to an embodiment of the present disclosure.

As shown in FIG. 12, in an embodiment, a face detection apparatus 1200 is provided. The face detection apparatus 1200 includes an image obtaining module 1210, an initial shape obtaining module 1220, a probability calculation module 1230, an error extraction module 1240, a shape error determining module 1250, an estimated shape calculation module 1260, and an iterative calculation module 1270.

The image obtaining module 1210 is configured to obtain a to-be-detected image.

The initial shape obtaining module 1220 is configured to obtain an initial shape of a current regression tree in a pre-constructed probability regression model.

The probability calculation module 1230 is configured to extract image features from the to-be-detected image and respectively calculate a probability of each of the leaf nodes of the current regression tree according to the image features.

The error extraction module 1240 is configured to extract an error of each of the leaf nodes from the current regression tree.

The shape error determining module 1250 is configured to determine a shape error of the current regression tree according to the probability and the error of each of the leaf nodes.

In an embodiment, the shape error determining module 1250 is further configured to calculate a product of the probability of each of the leaf nodes and the corresponding error respectively and accumulate products obtained through calculation, to obtain the shape error of the current regression tree.

The estimated shape calculation module 1260 is configured to calculate an estimated shape of the current regression tree according to the initial shape and the shape error.

The iterative calculation module 1270 is configured to perform iterative calculation by using the estimated shape as an initial shape of a neighboring next regression tree until a last regression tree in the probability regression model, to obtain an estimated shape of the last regression tree as a detected face shape.

The foregoing face detection apparatus extracts the image features from the to-be-detected image, calculates the probability of each of the leaf nodes of the current regression tree in the probability regression model, determines the shape error of the current regression tree according to the probability and the error of each of the leaf nodes, to calculate the estimated shape of the current regression tree, and uses the estimated shape as the initial shape of the neighboring next regression tree to perform iterative calculation, to gradually approach a true error and obtain an accurate face shape. A shape error of each of the regression trees is determined by the errors and probabilities of all the leaf nodes of the regress tree, to make the estimated shape be more stable and accurate and efficiently solve the problem of jitter of face feature points occurring in a video image sequence.

Figure 13:
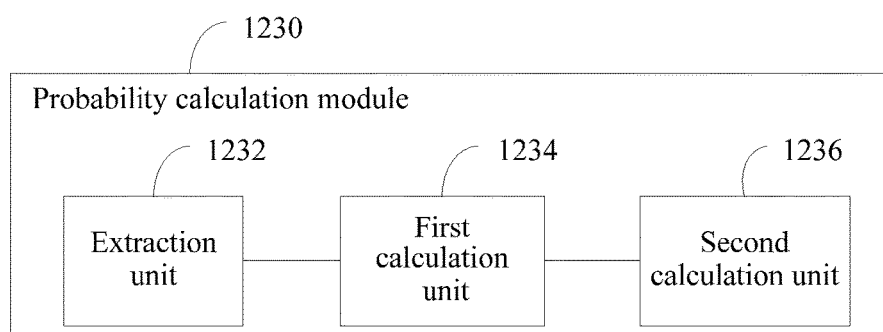
FIG. 13 is a block diagram of a probability calculation module according to an embodiment of the present disclosure.

As shown in FIG. 13, in an embodiment, the probability calculation module 1230 includes an extraction unit 1232, a first calculation unit 1234, and a second calculation unit 1236.

The extraction unit 1232 is configured to extract, by beginning from a root node of the current regression tree, the image features from the to-be-detected image according to the node information of each of the nodes.

The calculation unit 1234 is configured to calculate a branch probability of a corresponding node according to the image features extracted from each of the nodes, where the branch probability includes a left branch probability and a right branch probability, the right branch probability and the image features extracted from the corresponding node are in a positive correlation, and a sum of the left branch probability and the right branch probability is 1.

The second calculation unit 1236 is configured to determine a branch probability corresponding to a branch passed by each of the leaf nodes and calculate a probability of each of the leaf nodes according to the corresponding branch probability.

In one embodiment, the probability of each of the leaf nodes of the regression tree may be calculated according to the image features of the to-be-detected image, so that when the face shape of the to-be-detected image is detected according to the probability regression model, the shape error of each regression tree is determined by the errors and probabilities of all the leaf nodes of the regression tree, and thus, the estimated shape is more stable and accurate, and the problem of jitter of face feature points occurring in a video image sequence may be solved efficiently.

In an embodiment, the face detection apparatus 1200 further includes a filter module besides the image obtaining module 1210, the initial shape obtaining module 1220, the probability calculation module 1230, the error extraction module 1240, the shape error determining module 1250, the estimated shape calculation module 1260, and the iterative calculation module 1270.

The filter module is configured to perform median filtering processing on the to-be-detected image.

Figure 14:
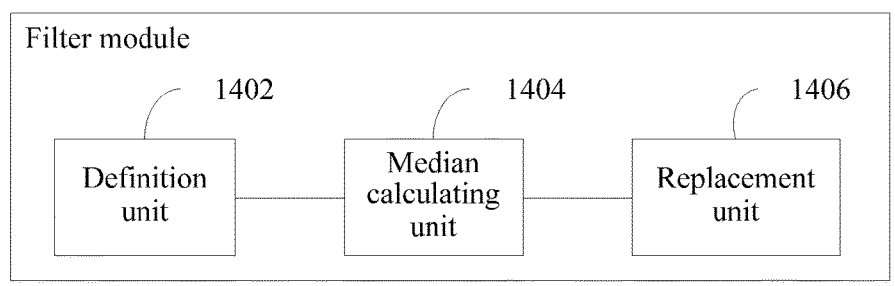
FIG. 14 is a block diagram of a filter module according to an embodiment of the present disclosure.

As shown in FIG. 14, the filter module includes a definition unit 1402, a median calculating unit 1404, and a replacement unit 1406.

The definition unit 1402 is configured to define a window having a preset size in the to-be-detected image.

The median calculating unit 1404 is configured to calculate a median of a grayscale value of each pixel point contained in the window.

The replacement unit 1406 is configured to replace a grayscale value of a pixel point at a center of the window with the median.

In one embodiment, after the to-be-detected image is obtained, filtering processing may be performed on the to-be-detected image, to reduce noises in the to-be-detected image and weaken noise influences of two consecutive frame images caused by a change of hardware and environmental illumination in the video image sequence, so that the finally detected face shape is more stable and accurate.

In an embodiment, the face detection apparatus 1200 further includes a model construction module.

The model construction module is configured to construct a cascaded regressive probability regression model according to a sample image set, the probability regression model including a multi-level random forest, and each level of the random forest including a plurality of regression trees.

Figure 15:
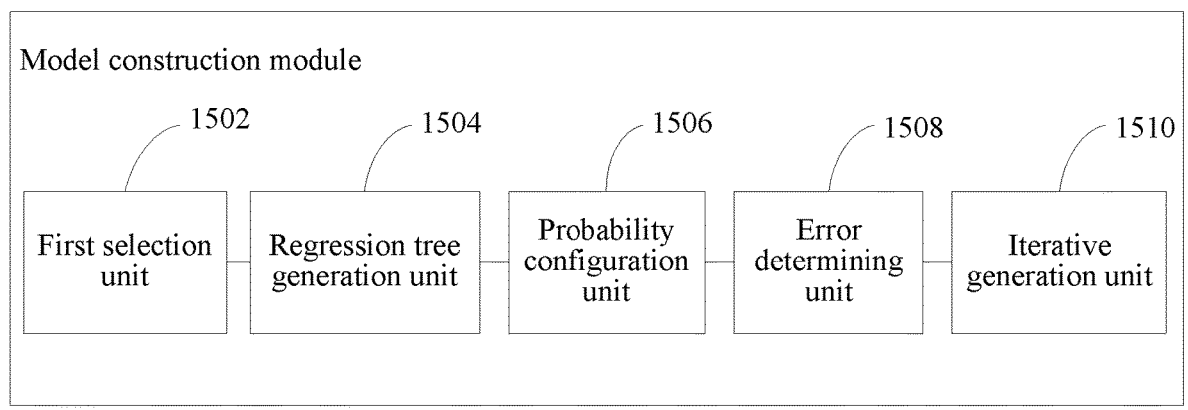
FIG. 15 is a block diagram of a model construction module according to an embodiment of the present disclosure.

As shown in FIG. 15, the model construction module includes a first selection unit 1502, a regression tree generation unit 1504, a probability configuration unit 1506, an error determining unit 1508, and an iterative generation unit 1510.

The first selection unit 1502 is configured to select a first pixel pair collection randomly from the sample image set when constructing each level of the random forest.

The regression tree generation unit 1504 is configured to divide sample images in the sample image set according to the first pixel pair collection and split to generate each of nodes of a regression tree.

The probability configuration unit 1506 is configured to configure a probability of each of leaf nodes of a generated regression tree.

In an embodiment, the probability configuration unit 1506 includes a first configuration sub-unit and a second configuration sub-unit.

The first configuration sub-unit is configured to configure, when splitting to generate each of the nodes of the regression tree, a corresponding branch probability for a node on which sample images are divided, where the branch probability includes a left branch probability and a right branch probability, the right branch probability and image features of the sample images are in a positive correlation, and a sum of the left branch probability and the right branch probability is 1.

The second configuration sub-unit is configured to configure the probability of each of the leaf nodes of the generated regression tree to be a product of branch probabilities corresponding to branches passed by the leaf nodes.

The error determining unit 1508 is configured to determine an error of each of the leaf nodes according to a true shape of a sample image allocated to each of the leaf nodes in the generated regression tree and an initially predicted shape of the generated regression tree.

The iterative generation unit 1510 is configured to calculate a predicted shape of the generated regression tree according to the initially predicted shape of the generated regression tree and the error of each of the leaf nodes, take the predicted shape as an initially predicted shape of a neighboring next regression tree and iteratively generate the next regression tree until generation of a regression tree of a last level of the random forest in the probability regression model is finished.

In an embodiment, the model construction module further includes a grouping unit, configured to group the sample images in the sample image set, and loop or iterates for a second preset number of times the following processing on the grouped sample images: selecting any sample image, randomly selecting, from a group to which the selected sample image belongs, a preset number of sample images, weighting and calculating the preset number of sample images to obtain a new sample image, and replacing the selected sample image with the new sample image.

In one embodiment, the cascaded probability regression model is constructed and generated according to each of the sample images in the sample image set, each level of the random forest in the probability regression model and each regression tree under each level of the random forest are both further prediction on the true error, when face detection is performed through the probability regression model, the shape error of each of the regression trees is determined according to the errors and the probabilities of all the leaf nodes of the regression tree, so that the estimated shape is more stable and accurate, and the problem of jitter of face feature points occurring in a video image sequence may be solved efficiently.

In an embodiment, the regression tree generation unit 1504 is further configured to perform the following processing on a root node and each of the nodes that are generated by splitting by beginning from the root node of the regression tree: selecting a second pixel pair collection randomly from the first pixel pair collection; and dividing sample images allocated to a node according to the second pixel pair collection, splitting the node to generate new branch nodes, determining a division pixel pair of the node, not stopping splitting to generate new branch nodes until a depth of the generated regression tree meets a preset depth.

In an embodiment, the regression tree generation unit 1504 includes a calculation sub-unit and a selection sub-unit.

The calculation sub-unit is configured to circulate randomly selecting a pixel pair from the second pixel pair collection to divide the sample images allocated to the node for a first preset number of times, split the node into new branch nodes, determine branch nodes where the divided sample images are located, and calculate errors of the divided sample images at the node.

The selection sub-unit is configured to select, from the second pixel pair collection, a pixel pair of the divided sample image that has a minimum error at the node as the division pixel pair of the node.

In one embodiment, the division pixel pair of each of the nodes in the regression tree is determined and the sample images are divided according to the division pixel pair, to ensure that each of the nodes has a minimum error and the constructed probability regression model is more accurate.

In an embodiment, the calculation sub-unit is further configured to obtain coordinate information of a pixel pair selected randomly from the second pixel pair collection;

extract image features from corresponding positions of the sample images allocated to the node according to the coordinate information; compare the image features extracted from the sample images with a preset division threshold, divide the sample images of which the image features are less than the division threshold to a left branch node and divide the sample images of which the image features are greater than or equal to the division threshold to a right branch node; calculate a first average shape of the sample images at the left branch node and determine a left branch error according to a true shape of the sample images at the left branch node and the first average shape; calculate a second average shape of the sample images at the right branch node and determine a right branch error according to a true shape of the sample images at the right branch node and the second average shape; and obtain a mean value according to a sum of the left branch error and the right branch error and a number of the sample images allocated to the node, to obtain an error of the node. In one embodiment, the error of the node under the randomly selected pixel pair may be calculated, to determine the division pixel pair of each of the nodes in the regression tree, and the sample images are divided according to the division pixel pair, to ensure that each of the nodes has a minimum error, so that the constructed probability regression mode is more accurate.

In an embodiment, a computer device is further provided. An internal structure of the computer device is shown in FIG. 1. The terminal includes an apparatus for constructing a face detection model, the apparatus for constructing a face detection model includes each module, and each module may be all or partially implemented by software, hardware, or a combination thereof.

In an embodiment, an apparatus for constructing a face detection model is provided. The apparatus for constructing a face detection model includes a model construction module, configured to construct a cascaded regressive probability regression model according to a sample image set, the probability regression model including a multi-level random forest, and each level of the random forest including a plurality of regression trees.

The model construction module includes a first selection unit, a regression tree generation unit, a probability configuration unit, an error determining unit, and an iterative generation unit.

The first selection unit is configured to select a first pixel pair collection randomly from the sample image set when constructing each level of the random forest.

The regression tree generation unit is configured to divide sample images in the sample image set according to the first pixel pair collection and split to generate each of nodes of a regression tree.

The probability configuration unit is configured to configure a probability of each of leaf nodes of a generated regression tree.

In an embodiment, the probability configuration unit includes a first configuration sub-unit and a second configuration sub-unit.

The first configuration sub-unit is configured to configure, when splitting to generate each of the nodes of the regression tree, a corresponding branch probability for a node on which sample images are divided, where the branch probability includes a left branch probability and a right branch probability, the right branch probability and image features of the sample images are in a positive correlation, and a sum of the left branch probability and the right branch probability is 1.

The second configuration sub-unit is configured to configure the probability of each of the leaf nodes of the generated regression tree to be a product of branch probabilities corresponding to branches passed by the leaf nodes.

The error determining unit is configured to determine an error of each of the leaf nodes according to a true shape of a sample image allocated to each of the leaf nodes in the generated regression tree and an initially predicted shape of the generated regression tree.

The iterative generation unit is configured to calculate a predicted shape of the generated regression tree according to the initially predicted shape of the generated regression tree and the error of each of the leaf nodes, take the predicted shape as an initially predicted shape of a neighboring next regression tree and iteratively generate the next regression tree until generation of a regression tree of a last level of the random forest in the probability regression model is finished.

In an embodiment, the model construction module further includes a grouping unit, configured to group the sample images in the sample image set, and circulate the following processing on the grouped sample images for a second preset number of times: selecting any sample image, randomly selecting, from a group to which the selected sample image belongs, a preset number of sample images, weighting and calculating the preset number of sample images to obtain a new sample image, and replacing the selected sample image with the new sample image.

In the apparatus for constructing a face detection model, the cascaded regressive probability regression model is constructed according to the sample image set, the sample images in the sample image set are divided according to the randomly selected first pixel pair collection, each of the nodes of the regression tree is generated through splitting, the probability of each of the leaf nodes of the generated regression tree is configured, and the error of each of the leaf nodes is determined, to obtain the predicted shape of the generated regression tree, and then, the predicted shape is used as an initially predicted shape of a neighboring next regression tree to iteratively generate the next regression tree. In the probability regression model, each level of the random forest and each of the regression trees under each level of the random forest are both further prediction on the true error. When face detection is performed through the probability regression model, the shape error of each of the regression trees is determined by the errors and probabilities of all the leaf nodes of the regress tree, to make the estimated shape be more stable and accurate and efficiently solve the problem of jitter of face feature points occurring in a video image sequence.

In an embodiment, the regression tree generation unit is further configured to perform the following processing on a root node and each of the nodes that are generated by splitting by beginning from the root node of the regression tree: selecting a second pixel pair collection randomly from the first pixel pair collection; and dividing sample images allocated to a node according to the second pixel pair collection, splitting the node to generate new branch nodes, determining a division pixel pair of the node, not stopping splitting to generate new branch nodes until a depth of the generated regression tree meets a preset depth.

In an embodiment, the regression tree generation unit includes a calculation sub-unit and a selection sub-unit.

The calculation sub-unit is configured to loop or iterate for a first preset number of times randomly selecting a pixel pair from the second pixel pair collection to divide the sample images allocated to the node, split the node into new branch nodes, determine branch nodes where the divided sample images are located, and calculate errors of the divided sample images at the node.

The selection sub-unit is configured to select, from the second pixel pair collection, a pixel pair of the divided sample image that has a minimum error at the node as the division pixel pair of the node.

In one embodiment, the division pixel pair of each of the nodes in the regression tree is determined and the sample images are divided according to the division pixel pair, to ensure that each of the nodes has a minimum error and the constructed probability regression model is more accurate.

In an embodiment, the calculation sub-unit is further configured to obtain coordinate information of a pixel pair selected randomly from the second pixel pair collection; extract image features from corresponding positions of the sample images allocated to the node according to the coordinate information; compare the image features extracted from the sample images with a preset division threshold, divide the sample images of which the image features are less than the division threshold to a left branch node and divide the sample images of which the image features are greater than or equal to the division threshold to a right branch node; calculate a first average shape of the sample images at the left branch node and determine a left branch error according to a true shape of the sample images at the left branch node and the first average shape; calculate a second average shape of the sample images at the right branch node and determine a right branch error according to a true shape of the sample images at the right branch node and the second average shape; and obtain a mean value according to a sum of the left branch error and the right branch error and a number of the sample images allocated to the node, to obtain an error of the node.

In one embodiment, the error of the node under the randomly selected pixel pair may be calculated, to determine the division pixel pair of each of the nodes in the regression tree, and the sample images are divided according to the division pixel pair, to ensure that each of the nodes has a minimum error, so that the constructed probability regression mode is more accurate.

An embodiment of the present disclosure further provides a computer device.

The computer device includes a memory and one or more processors, the memory stores computer-readable instructions, and the computer-readable instructions, when being executed by the one or more processors, cause the one or more processors to perform the following steps.

An embodiment of the present disclosure further provides a computer device. The computer device includes a memory and one or more processors, the memory stores computer-readable instructions, and the computer-readable instructions, when being executed by the one or more processors, cause the one or more processors to perform the following steps.

An embodiment of the present disclosure further provides a readable storage medium. One or more non-volatile computer-readable storage mediums storing computer-readable instructions, and when being executed by one or more processors, the computer-readable instructions cause the one or more processors to perform the following steps.

An embodiment of the present disclosure further provides a readable storage medium. One or more non-volatile computer-readable storage mediums storing computer-readable instructions, and when being executed by one or more processors, the computer-readable instructions cause the one or more processors to perform the following steps.

It should be understood that although the steps in the embodiments of the present disclosure are not necessarily performed in an order indicated by the step numbers. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, storage, database or another medium used in the various embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only describe several implementations of the present disclosure, which are described specifically and in detail, and therefore cannot be construed as a limitation to the patent scope of the present disclosure. It should be noted that various changes and improvements may further be made by a person of ordinary skill in the art without departing from the idea of the present disclosure, and these changes and improvements all fall within the protection scope of the present disclosure. Therefore, the protection scope of the present disclosure shall be subject to the appended claims.

What is claimed is:

1. A face detection method, applied to a computing device, the method comprising:
constructing a face detection model, wherein the face detection model includes a first regression tree and a second regression tree neighboring the first regression tree, the face detection model is constructed by generating a first predicted face shape from the first regression tree and feeding the first predicted face shape as an input to the second regression tree, the first regression tree includes a root node, and generating the first predicted face shape from the first regression tree includes:

selecting a pixel pair collection from N sample images;

identifying a division pixel pair of the root node from the pixel pair collection, wherein the divisional pixel pair of the root node is a pixel pair (U, V) having a minimum error among the N samples images at the root node;

allocating N1 sample images of the N sample images to a left branch node of the root node and allocating N2 sample images of the N sample images to a right branch node of the root node, a sum of N1 and N2 being N;

identifying a division pixel pair of the left branch node from the N1 sample images, wherein the divisional pixel pair of the left branch node is a pixel pair $(U_1, V_1)$ having a minimum error among the N1 sample images at the left branch node;

allocating N11 sample images of the N1 sample images to a left sub-branch node of the left branch node and allocating N12 sample images of the N1 sample images to a right sub-branch node of the left branch node, a sum of N11 and N12 being N1;

determining an error of the left sub-branch node and right sub-branch node according to a true shape of each of the N11 sample images allocated to the left sub-branch node and of each of the N12 sample images allocated to the right sub-branch node; and obtaining the first predicted face shape of the first regression tree according to the error of the left sub-branch node and right sub-branch node.

2. The method of claim 1, further comprising:

receiving a to-be-detected image as an input to the face detection model to generate a detected face shape of the to-be-detected image.

3. The method of claim 2, further comprising: performing median filtering on the to-be-detected image, the median filtering is performed by:

defining a window of a preset size in the to-be-detected image;

calculating a median grayscale value of pixel points contained in the window; and replacing a grayscale value of a pixel point at or near a center of the window with the median grayscale.

4. The method of claim 1, wherein the face detection model includes a first forest and a second forest neighboring the first forest, the first forest including the first regression tree and the second regression tree, and the method further comprises:

generating a second predicted face shape from the second regression tree; and feeding the second predicted face shape as an input to the second forest.

5. The method of claim 1, wherein each of the sample images is an image with feature points marked on a face area, and a face shape of the each of the sample images is represented by coordinate information corresponding to the feature points.

6. The method of claim 1, further comprising: normalizing the sample images, wherein the normalizing further includes:

scaling and translating feature points of each of the sample images at a same degree to obtain a face shape of the each of the sample images; and mapping the face shape of the each of the sample images into a unified standard matrix to generate normalized shape information of the each of the samples images in the unified standard matrix, the normalized shape information including coordinate information corresponding to each of the feature points.

7. The method of claim 1, further comprising: performing reduction-of-over-fitting on the sample images, wherein the reduction-of-overfitting is performed by:

grouping the sample images into a plurality of groups, the plurality of groups including a first group and a second group;

identifying a sample image $I_i$ from the first group;

weighting and calculating face shapes of sample image $I_k$ and $I_j$ according to a preset weight value to obtain a new face shape, the sample image $I_k$ being from the first group or the second group, and the sample image $I_j$ being from the first group or the second group; and replacing a face shape of the sample image $I_i$ with the new face shape.

8. The method of claim 1, wherein the pixel pair collection is identified from the sample images according to formula $$P=e^{-\lambda\|u-v\|},$$

$\lambda$ is a general coefficient, u and V respectively represent coordinate information of two randomly selected pixel points, when P calculated according to the randomly selected pixel pair is less than a preset threshold $T_p$, the pixel pair is placed in the pixel pair collection.

9. The method of claim 1, wherein the root node includes information on a left branch probability and a right branch probability, the left branch probability represents a probability a sample image is allocated to the N1 sample images, the right branch probability represents a probability a sample image is allocated to the N2 sample images, and a sum of the left branch probability and the right branch probability is 1.

10. A computer device, comprising: a memory storing computer program instructions; and a processor coupled to the memory and configured to execute the computer program instructions and perform:

constructing a face detection model, wherein the face detection model includes a first regression tree and a second regression tree neighboring the first regression tree, the face detection model is constructed by generating a first predicted face shape from the first regression tree and feeding the first predicted face shape as an input to the second regression tree, the first regression tree includes a root node, and generating the first predicted face shape from the first regression tree includes:

selecting a pixel pair collection from N sample images;

identifying a division pixel pair of the root node from the pixel pair collection, wherein the divisional pixel pair of the root node is a pixel pair (U, V) having a minimum error among the N samples images at the root node;

allocating N1 sample images of the N sample images to a left branch node of the root node and allocating N2 sample images of the N sample images to a right branch node of the root node, a sum of N1 and N2 being N;

identifying a division pixel pair of the left branch node from the N1 sample images, wherein the divisional pixel pair of the left branch node is a pixel pair $(U_1, V_1)$ having a minimum error among the N1 sample images at the left branch node;

allocating N11 sample images of the N1 sample images to a left sub-branch node of the left branch node and allocating N12 sample images of the N1 sample images to a right sub-branch node of the left branch node, a sum of N11 and N12 being N1;

determining an error of the left sub-branch node and right sub-branch node according to a true shape of each of the N11 sample images allocated to the left sub-branch node and of each of the N12 sample images allocated to the right sub-branch node; and obtaining the first predicted face shape of the first regression tree according to the error of the left sub-branch node and right sub-branch node.

11. The computer device of claim 10, wherein the processor is configured to execute the computer program instructions and further perform:

receiving a to-be-detected image as an input to the face detection model to generate a detected face shape of the to-be-detected image.

12. The computer device of claim 11, wherein the processor is configured to execute the computer program instructions and further perform: performing median filtering on the to-be-detected image, the median filtering is performed by:

defining a window of a preset size in the to-be-detected image;

calculating a median grayscale value of pixel points contained in the window; and replacing a grayscale value of a pixel point at or near a center of the window with the median grayscale.

13. The computer device of claim 10, wherein the face detection model includes a first forest and a second forest neighboring the first forest, the first forest including the first regression tree and the second regression tree, and wherein the processor is configured to execute the computer program instructions and further perform:

generating a second predicted face shape from the second regression tree; and feeding the second predicted face shape as an input to the second forest.

14. The computer device of claim 10, wherein each of the sample images is an image with feature points marked on a face area, and a face shape of the each of the sample images is represented by coordinate information corresponding to the feature points.

15. The computer device of claim 10, wherein the processor is configured to execute the computer program instructions and further perform: normalizing the sample images, wherein the normalizing further includes:

scaling and translating feature points of each of the sample images at a same degree to obtain a face shape of the each of the sample images; and mapping the face shape of the each of the sample images into a unified standard matrix to generate normalized shape information of the each of the samples images in the unified standard matrix, the normalized shape information including coordinate information corresponding to each of the feature points.

16. The computer device of claim 10, wherein the processor is configured to execute the computer program instructions and further perform: performing reduction-of-overfitting on the sample images, wherein the reduction-of-overfitting is performed by:

grouping the sample images into a plurality of groups, the plurality of groups including a first group and a second group;

identifying a sample image $I_i$ from the first group;

weighting and calculating face shapes of sample image $I_k$ and $I_j$ according to a preset weight value to obtain a new face shape, the sample image $I_k$ being from the first group or the second group, and the sample image $I_j$ being from the first group or the second group; and replacing a face shape of the sample image $I_i$ with the new face shape.

17. The computer device of claim 10, wherein the pixel pair collection is identified from the sample images according to formula $$P=e^{-\lambda\|u-v\|},$$

$\lambda$ is a general coefficient, u and V respectively represent coordinate information of two randomly selected pixel points, when P calculated according to the randomly selected pixel pair is less than a preset threshold $T_p$, the pixel pair is placed in the pixel pair collection.

18. The computer device of claim 10, wherein the root node includes information on a left branch probability and a right branch probability, the left branch probability represents a probability a sample image is allocated to the N1 sample images, the right branch probability represents a probability a sample image is allocated to the N2 sample images, and a sum of the left branch probability and the right branch probability is 1.

19. A non-transitory computer-readable storage medium storing computer program instructions executable by at least one processor to perform:

constructing a face detection model, wherein the face detection model includes a first regression tree and a second regression tree neighboring the first regression tree, the face detection model is constructed by generating a first predicted face shape from the first regression tree and feeding the first predicted face shape as an input to the second regression tree, the first regression tree includes a root node, and generating the first predicted face shape from the first regression tree includes:

selecting a pixel pair collection from N sample images;

identifying a division pixel pair of the root node from the pixel pair collection, wherein the divisional pixel pair of the root node is a pixel pair (U, V) having a minimum error among the N samples images at the root node;

allocating N1 sample images of the N sample images to a left branch node of the root node and allocating N2 sample images of the N sample images to a right branch node of the root node, a sum of N1 and N2 being N;

identifying a division pixel pair of the left branch node from the N1 sample images, wherein the divisional pixel pair of the left branch node is a pixel pair $(U_1, V_1)$ having a minimum error among the N1 sample images at the left branch node;

allocating N11 sample images of the N1 sample images to a left sub-branch node of the left branch node and allocating N12 sample images of the N1 sample images to a right sub-branch node of the left branch node, a sum of N11 and N12 being N1;

determining an error of the left sub-branch node and right sub-branch node according to a true shape of each of the N11 sample images allocated to the left sub-branch node and of each of the N12 sample images allocated to the right sub-branch node; and obtaining the first predicted face shape of the first regression tree according to the error of the left sub-branch node and right sub-branch node.

20. The non-transitory computer-readable storage medium of claim 19, wherein the computer program instructions are executable by the at least one processor to further perform:

receiving a to-be-detected image as an input to the face detection model to generate a detected face shape of the to-be-detected image.

\* \* \* \* \*